US012340705B2

(12) United States Patent
Robertson et al.

(10) Patent No.: US 12,340,705 B2
(45) Date of Patent: *Jun. 24, 2025

(54) MUTUALLY EXCLUSIVE THREE DIMENSIONAL FLYING SPACES

(71) Applicant: Kitty Hawk Corporation, Palo Alto, CA (US)

(72) Inventors: Cameron Robertson, San Mateo, CA (US); Alex Roetter, San Francisco, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/314,017

(22) Filed: May 8, 2023

(65) Prior Publication Data

US 2023/0386349 A1 Nov. 30, 2023

Related U.S. Application Data

(63) Continuation of application No. 16/535,867, filed on Aug. 8, 2019, now Pat. No. 11,694,562, which is a
(Continued)

(51) Int. Cl.
*G08G 5/00* (2025.01)
*G05D 1/00* (2006.01)
(Continued)

(52) U.S. Cl.
CPC .............. *G08G 5/55* (2025.01); *G05D 1/101* (2013.01); *G06F 16/248* (2019.01); *G06Q 40/06* (2013.01); *G08G 5/59* (2025.01); *G08G 5/80* (2025.01)

(58) Field of Classification Search
CPC .... G08G 5/0021; G08G 5/006; G08G 5/0052; G08G 5/045; G08G 5/0086; G08G 5/0013; G08G 5/0069; G08G 5/0091; G08G 5/0034; G08G 5/0008; G08G 5/0026; G08G 5/0065; G08G 5/0078; G08G 5/003;
(Continued)

(56) References Cited

U.S. PATENT DOCUMENTS 4,853,700 A 8/1989 Funatsu
5,420,582 A 5/1995 Kubbat
(Continued)

FOREIGN PATENT DOCUMENTS

EP 1764759 3/2007
NZ 724931 1/2018

*Primary Examiner* — Nga X Nguyen
(74) *Attorney, Agent, or Firm* — Van Pelt, Yi & James LLP

(57) ABSTRACT

Boundary information for a three-dimensional (3D) flying space is obtained. An input associated with steering a vehicle is received from an input device and location information associated with the vehicle is received from a location sensor. A control signal for the vehicle is generated based at least in part on the boundary information, the input, and the location information. In the event the input would cause the vehicle to cross the boundary of the 3D flying space if obeyed, the control signal for the vehicle is generated so that the vehicle is prevented from crossing the boundary of the 3D flying space. In response to receiving an indication associated with the vehicle landing, the boundary information is modified so that the 3D flying space includes a landing pathway.

15 Claims, 12 Drawing Sheets

Related U.S. Application Data continuation of application No. 16/110,922, filed on Aug. 23, 2018, now Pat. No. 10,438,495.

(51) Int. Cl.
*G05D 1/10* (2006.01)
*G06F 16/248* (2019.01)
*G06Q 40/06* (2012.01)
*G08G 5/55* (2025.01)
*G08G 5/59* (2025.01)
G08G 5/80 (2025.01)

(58) Field of Classification Search
CPC .. G08G 5/0039; G08G 5/0082; G08G 5/0095; G08G 5/55; G08G 5/59; G08G 5/80; G08G 5/57; G08G 5/26; G08G 5/21; G08G 5/76; B64U 2101/31; B64U 2201/10; B64U 10/13; G05D 1/101; G05D 1/102; G05D 1/0011; G05D 1/005; G05D 1/0202; G05D 1/0094; G05D 1/106; G05D 1/104; G06Q 40/06; G06Q 10/04; G06Q 10/087; G06Q 20/382; G06Q 30/018; B64F 1/00; B64F 1/222; G08B 13/19608; G08B 13/19613; G08B 13/1965; G08B 15/00; G08B 21/02; G08B 7/066; H04W 4/08; H04W 4/029; H04W 4/42; Y02A 90/10; G06F 16/248; B64C 25/54; B64C 29/0016
See application file for complete search history.

(56) References Cited

U.S. PATENT DOCUMENTS

| | | |
|---|---|---|
| 5,920,321 A | 7/1999 | Owen |
| 6,085,150 A | 7/2000 | Henry |
| 6,314,363 B1 | 11/2001 | Pilley |
| 6,433,729 B1 | 8/2002 | Staggs |
| 6,653,947 B2 | 11/2003 | Dwyer |
| 6,696,980 B1 | 2/2004 | Langner |
| 7,010,398 B2 | 3/2006 | Wilkins, Jr. |
| 7,598,888 B2 | 10/2009 | Matuska |
| 7,603,209 B2 | 10/2009 | Dwyer |
| 7,672,758 B2 | 3/2010 | Astruc |
| 7,693,621 B1 | 4/2010 | Chamas |
| 7,869,943 B1 | 1/2011 | Simon |
| 8,140,197 B2 | 3/2012 | Lapidot |
| 8,160,755 B2 | 4/2012 | Nichols |
| 8,244,418 B1 | 8/2012 | Frank |
| 8,339,283 B2 | 12/2012 | Filliatre |
| 8,362,925 B2 | 1/2013 | Brinkman |
| 8,527,118 B2 | 9/2013 | Jones |
| 8,576,094 B2 | 11/2013 | Suddreth |
| 8,581,748 B1 | 11/2013 | Barber |
| 8,629,787 B1 | 1/2014 | Rathinam |
| 8,786,633 B2 | 7/2014 | Dairman |
| 8,849,477 B2 | 9/2014 | Brinkman |
| 8,849,483 B2 | 9/2014 | Kuwata |
| 8,965,601 B1 | 2/2015 | Barber |
| 8,983,689 B2 | 3/2015 | Putz |
| 9,014,880 B2 | 4/2015 | Durling |
| 9,020,663 B2 | 4/2015 | Smith |
| 9,086,280 B2 | 7/2015 | Gurusamy |
| 9,117,368 B2 | 8/2015 | Agarwal |
| 9,132,913 B1 | 9/2015 | Shapiro |
| 9,147,349 B2 | 9/2015 | Maddanimath |
| 9,237,313 B2 | 1/2016 | Aspen |
| 9,354,078 B2 | 5/2016 | Burgin |
| 9,405,005 B1 | 8/2016 | Arteaga |
| 9,487,304 B1 | 11/2016 | Bowen |
| 9,495,877 B2 | 11/2016 | Duffy |
| 9,501,060 B1 | 11/2016 | Xingyu |
| 9,508,264 B2 | 11/2016 | Chan |
| 9,530,323 B1 | 12/2016 | Maji |
| 9,728,089 B2 | 8/2017 | Marcus |
| 9,734,723 B1 | 8/2017 | Bruno |
| 9,875,659 B2 | 1/2018 | Feyereisen |
| 10,037,706 B1 | 7/2018 | Cutler |
| 10,109,206 B2 | 10/2018 | Ichihara |
| 10,147,329 B2 | 12/2018 | Liu |
| 10,189,577 B2 | 1/2019 | Moore |
| 10,388,049 B2 | 8/2019 | Songa |
| 10,438,495 B1 | 10/2019 | Robertson |
| 10,446,041 B1 | 10/2019 | Robertson |
| 10,538,324 B2 | 1/2020 | Fengler |
| 10,586,463 B2 | 3/2020 | Xu |
| 10,598,932 B1 | 3/2020 | Marshall |
| 10,789,854 B1 | 9/2020 | Kolesinski |
| 11,282,307 B2 | 3/2022 | Yoshimura |
| 11,518,510 B1 | 12/2022 | Gohl |
| 11,694,562 B2 | 7/2023 | Robertson |
| 2002/0053983 A1 | 5/2002 | Chamas |
| 2003/0137444 A1 | 7/2003 | Stone |
| 2003/0151630 A1 | 8/2003 | Kellman |
| 2004/0015274 A1 | 1/2004 | Wilkins, Jr. |
| 2004/0030465 A1 | 2/2004 | Conner |
| 2004/0160341 A1 | 8/2004 | Feyereisen |
| 2005/0200501 A1 | 9/2005 | Smith |
| 2005/0206533 A1 | 9/2005 | Rogers |
| 2006/0241820 A1 | 10/2006 | Dwyer |
| 2006/0265109 A1 | 11/2006 | Canu-Chiesa |
| 2007/0168122 A1 | 7/2007 | Aspen |
| 2007/0235594 A1 | 10/2007 | Wingett |
| 2008/0039984 A1 | 2/2008 | Bitar |
| 2008/0051947 A1 | 2/2008 | Kemp |
| 2008/0114504 A1 | 5/2008 | Goodman |
| 2008/0142642 A1 | 6/2008 | Marino |
| 2008/0147320 A1 | 6/2008 | Burch |
| 2008/0154493 A1* | 6/2008 | Bitar ............... G01S 13/953 701/532 |
| 2009/0105890 A1 | 4/2009 | Jones |
| 2009/0210109 A1 | 8/2009 | Ravenscroft |
| 2010/0023187 A1 | 1/2010 | Gannon |
| 2010/0094487 A1 | 4/2010 | Brinkman |
| 2010/0145599 A1 | 6/2010 | Wise |
| 2010/0280753 A1 | 11/2010 | Chytil |
| 2010/0292871 A1 | 11/2010 | Schultz |
| 2010/0332056 A1 | 12/2010 | Kirk |
| 2011/0001654 A1* | 1/2011 | Fouet ............... G01S 13/953 342/30 |
| 2011/0077804 A1 | 3/2011 | He |
| 2011/0202206 A1 | 8/2011 | Karthikeyan |
| 2011/0231036 A1 | 9/2011 | Yogesha |
| 2011/0231096 A1 | 9/2011 | Ridenour, II |
| 2012/0194556 A1 | 8/2012 | Schmitt |
| 2012/0245835 A1 | 9/2012 | Weitz |
| 2013/0027226 A1 | 1/2013 | Cabos |
| 2013/0060405 A1 | 3/2013 | Komatsuzaki |
| 2013/0138275 A1 | 5/2013 | Nauman |
| 2013/0234884 A1 | 9/2013 | Bunch |
| 2013/0261850 A1 | 10/2013 | Smith |
| 2014/0018979 A1 | 1/2014 | Goossen |
| 2014/0266807 A1 | 9/2014 | Behara |
| 2015/0254988 A1 | 9/2015 | Wang |
| 2015/0325064 A1 | 11/2015 | Downey |
| 2016/0163203 A1 | 6/2016 | Wang |
| 2017/0110018 A1* | 4/2017 | Wang ............... G08G 5/0078 |
| 2017/0248969 A1 | 8/2017 | Ham |
| 2017/0278404 A1 | 9/2017 | Gordon |
| 2017/0285662 A1 | 10/2017 | Cherepinsky |
| 2017/0320589 A1 | 11/2017 | Moravek |
| 2017/0334559 A1* | 11/2017 | Bouffard ............ G08G 5/0034 |
| 2017/0357273 A1 | 12/2017 | Michini |
| 2017/0372618 A1 | 12/2017 | Xu |
| 2018/0033313 A1* | 2/2018 | Mellema ............ G08G 5/0034 |
| 2018/0068567 A1 | 3/2018 | Gong |
| 2018/0204469 A1 | 7/2018 | Moster |
| 2018/0268721 A1 | 9/2018 | Mccullough |
| 2018/0354636 A1 | 12/2018 | Darnell |
| 2020/0004272 A1* | 1/2020 | Pilskalns ............ G08G 5/55 |
| 2020/0143691 A1 | 5/2020 | Sidiropoulos |
| 2022/0185471 A1 | 6/2022 | Michini |

(56) References Cited

U.S. PATENT DOCUMENTS

| | | |
|---|---|---|
| 2022/0214703 A1 | 7/2022 | Zhong |
| 2023/0377469 A1 | 11/2023 | Ortlieb |
| 2024/0046800 A1 | 2/2024 | Ruelke |

* cited by examiner

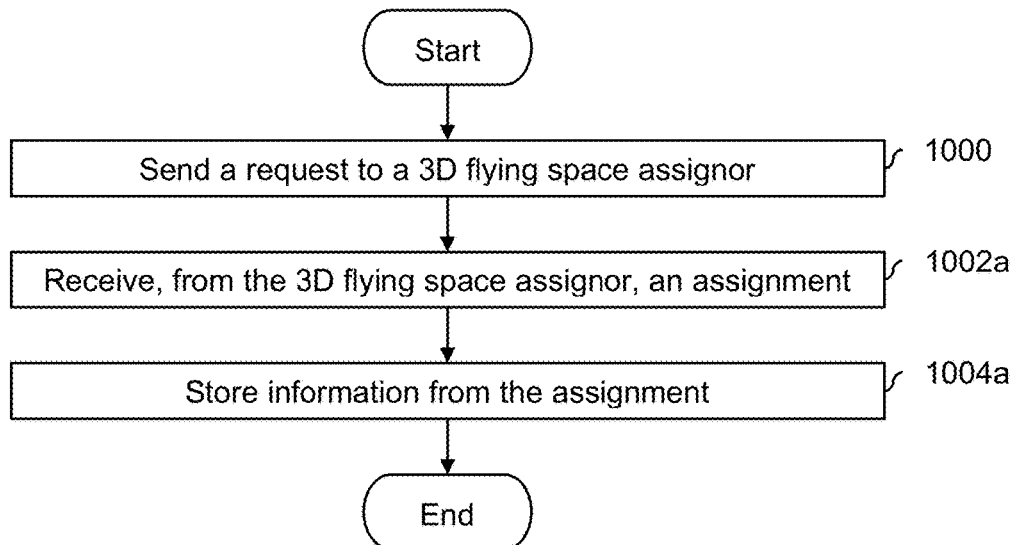
FIG. 10A
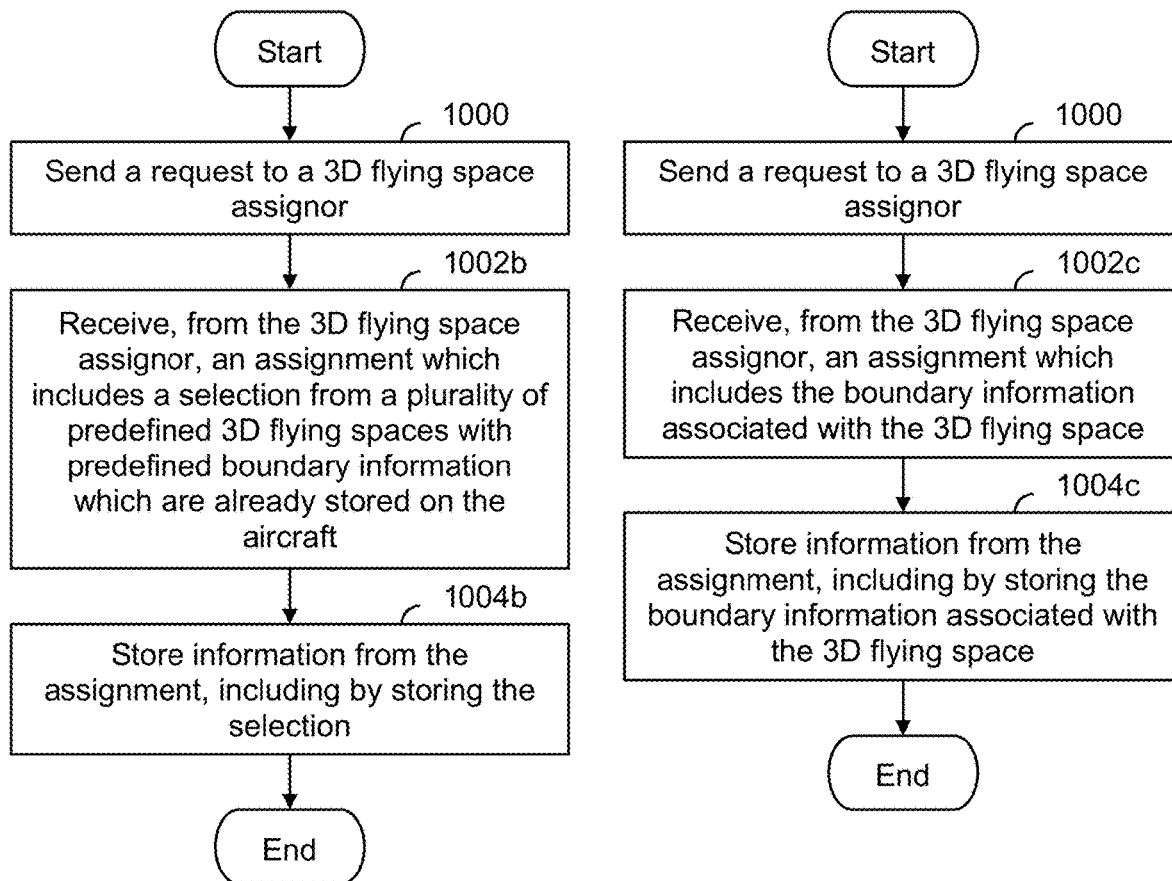
FIG. 10B
FIG. 10C

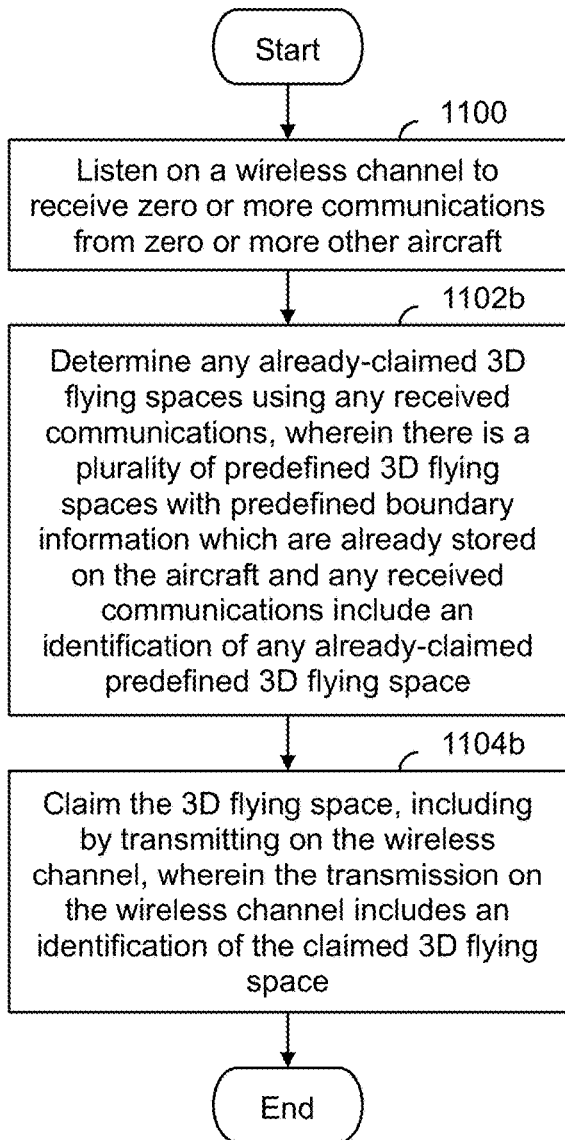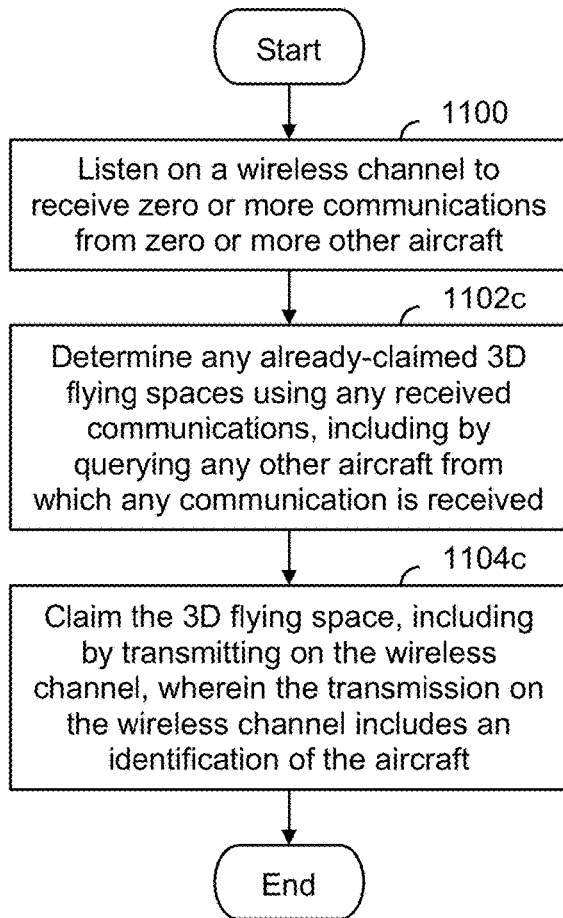
FIG. 11B
FIG. 11C

MUTUALLY EXCLUSIVE THREE DIMENSIONAL FLYING SPACES

CROSS REFERENCE TO OTHER APPLICATIONS

This application is a continuation of U.S. patent application Ser. No. 16/535,867, entitled MUTUALLY EXCLUSIVE THREE DIMENSIONAL FLYING SPACES filed Aug. 8, 2019 which is incorporated herein by reference for all purposes, which is a continuation of U.S. patent application Ser. No. 16/110,922 entitled MUTUALLY EXCLUSIVE THREE DIMENSIONAL FLYING SPACES filed Aug. 23, 2018, now U.S. Pat. No. 10,438,495, which is incorporated herein by reference for all purposes.

BACKGROUND OF THE INVENTION

New types of aircraft are being developed for use by relatively inexperienced pilots (e.g., without a pilot's license and/or without extensive training flying a plane). Techniques to ensure the safety of such pilots and those around them would be desirable.

BRIEF DESCRIPTION OF THE DRAWINGS

Various embodiments of the invention are disclosed in the following detailed description and the accompanying drawings.

FIG. 10A is a flowchart illustrating an embodiment of a process to obtain boundary information associated with a three-dimensional (3D) flying space using an assignor.

FIG. 10B is a flowchart illustrating an embodiment of a process to obtain boundary information associated with a three-dimensional (3D) flying space using an assignor where there are predefined 3D flying spaces.

FIG. 10C is a flowchart illustrating an embodiment of a process to obtain boundary information associated with a three-dimensional (3D) flying space using an assignor where there are no predefined 3D flying spaces.

FIG. 11B is a flowchart illustrating an embodiment of a process to obtain boundary information associated with a three-dimensional (3D) flying space when there is no authority which assigns 3D flying spaces and there are predefined 3D flying spaces.

FIG. 11C is a flowchart illustrating an embodiment of a process to obtain boundary information associated with a three-dimensional (3D) flying space when there is no authority which assigns 3D flying spaces and there are no predefined 3D flying spaces.

DETAILED DESCRIPTION

Figure 1:
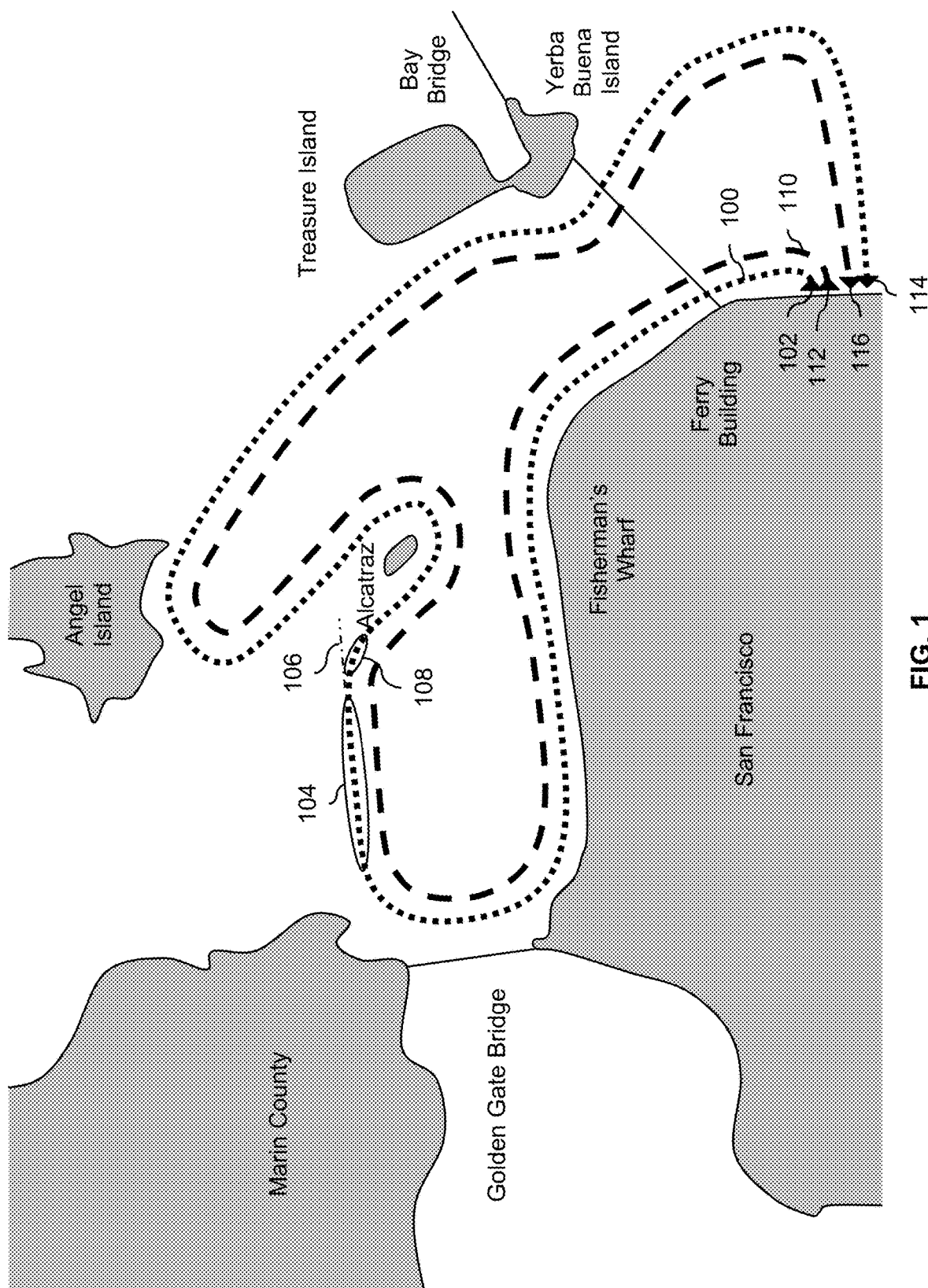
FIG. 1 is a diagram illustrating an embodiment of three-dimensional (3D) flying spaces associated with a permitted route.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a three-dimensional (3D) flying space are described below. In some applications, a three-dimensional (3D) flying space is a virtual 3D space which the aircraft will remain within, even if a pilot's input or instructions indicate that the pilot wants to leave the 3D flying space. In some embodiments, the aircraft does this by obtaining boundary information associated with a 3D flying space, receiving an input associated with flying an aircraft, receiving location information associated with the aircraft, and generating a control signal for the aircraft based at least in part on the boundary information, the input, and the location information, wherein the control signal is responsive to the input in a manner that would not cause the aircraft to cross a boundary associated with the 3D flying space. The shape of the 3D flying space may vary depending upon the embodiment and/or application. In some embodiments, the 3D flying space is associated with a permitted path and/or route and has a tube-like shape (e.g., the 3D flying space has a shape which is generally longer than it is wider or taller). In some embodiments, the 3D flying space permits more freedom of movement laterally (e.g., the 3D flying space is not so tube-like and permits more movement in a 2D plane or at some given altitude).

FIG. 1 is a diagram illustrating an embodiment of three-dimensional (3D) flying spaces associated with a permitted route. In the example shown, a person can get on an aircraft and take a tour of sights on the San Francisco Bay and along the San Francisco waterfront. For example, the person may first watch a safety video which includes instructions on how to fly the aircraft and is then permitted to rent an aircraft. In one example, the aircraft has floats (e.g., so that the aircraft is buoyant on water) and the pilot performs a vertical takeoff from water.

The pilot guides their plane so that it enters the first 3D flying space (100) at the entrance (102) to that permitted route. Using the controls and/or input devices of the aircraft (e.g., a joystick), the pilot is permitted to fly their aircraft within the three-dimensional space defined by 3D flying space 100 as desired but is not permitted to deviate from the permitted path or route shown. For example, some types of aircraft can hover in place and the pilot may (if desired) stop along the route or path (e.g., with the aircraft hovering in-air) to take pictures of iconic and/or scenic San Francisco landmarks. Alternatively, they can fly along the first 3D flying space (100) as fast or as slow as they want without stopping.

A more formal way of describing this type of 3D flying space is to say that it includes at least one entrance and exit and that the length (i.e., the distance measured from the entrance to the exit) is the largest dimension compared to a height or a width (e.g., associated with a cross-sectional area).

As an example of how the pilot is not permitted to steer or otherwise guide the aircraft outside of a 3D flying space, suppose that the pilot is in straight section 104 of 3D flying space 100. To fly through this straight section 104, the pilot will push their joystick forward (e.g., assuming the input device is a joystick). If the pilot is not paying attention and keeps pushing the joystick forward when the straight section ends and 3D flying space 100 begins to turn to the pilot's right at bend 108, the aircraft will not permit the pilot to steer or otherwise guide the aircraft outside of the permitted path or route corresponding to 3D flying space 100 shown here. In this example, the pilot's instruction (in this example, to fly straight forward even though the permitted route turns) would be interpreted or handled by the aircraft in the following manner. Since the pilot's desired direction of flight (e.g., corresponding to path or trajectory 106) is not completely orthogonal to bend 108, the aircraft will continue to move (e.g., as opposed to stopping and hovering midair), but will turn so that the aircraft follows bend 108 and will not fly along forward path or trajectory 106, even though the pilot is holding the joystick forward. In contrast, other types of aircraft (e.g., which have no understanding of a 3D flying space and/or which are not configured to respect the boundaries defined by a 3D flying space) would obey the pilot's input and those aircraft would continue on the forward path or trajectory (106) which deviates from the bend (108) in 3D flying space 100.

In some embodiments, to help signal to the pilot that the permitted path or route has turned (i.e., and is no longer straight in that section), the aircraft may rotate about a yaw axis so that the pilot and the aircraft are facing in the direction of the permitted path or route defined by the 3D flying space. For example, at bend 108, the aircraft may automatically turn to the right (e.g., a combination of yawing and banking), even though the pilot is not signaling this rotation of the aircraft.

For completeness, suppose that the above exemplary interpretive rules (i.e., about how an aircraft handles a pilot's input when those instructions would cause the aircraft to leave the boundaries defined by a 3D flying space) are applied to the same situation as described above but the permitted path or route had a sharp, 90° turn instead of a slight turn or bend. In that case, since the desired direction of flight (e.g., indicated by the pilot input via the joystick) is completely orthogonal to a boundary of the 3D flying space, the aircraft may come to a gradual stop (e.g., hovering in air) or slow down at the turn, even though the pilot may be pushing the joystick forward and may continue to hold the joystick forward. As described above, other aircraft would have no concept of a 3D flying space and/or its boundaries and would permit the aircraft to fly forwards.

Returning to 3D flying space 100 shown here, the selected route or path may be helpful in preventing pilots from flying into more dangerous and/or restricted areas. For example, the winds west of the Golden Gate Bridge may be significantly stronger than the winds east of the bridge, making flying much more difficult in that area. In this example, the pilots may be relatively inexperienced and/or tourists unfamiliar with the area and so a 3D flying space or permitted path which keeps an aircraft east of the Golden Gate Bridge (as shown here) will prevent the pilot and aircraft from entering more dangerous areas. Similarly, the exemplary 3D flying space shown here keeps the pilot and aircraft from entering protected airspaces associated with the Oakland or San Francisco airports.

A 3D flying space also helps to prevent collisions between two aircraft. For example, suppose a second pilot came along and wanted to take the same tour as the first pilot. The second pilot and their aircraft would be assigned to the second 3D flying space (110). Accordingly, they would enter the second entrance (112) associated with the second 3D flying space (110). Even if the first pilot is very slow (e.g., making many stops along the way), the second pilot will not run into the first pilot's aircraft because the first 3D flying space (100) and the second 3D flying space (110) do not intersect or otherwise overlap. Rather, the two permitted paths run parallel to each other from the entrances (102 and 112) all the way to the exits (114 and 116).

The following figure shows some exemplary cross-sectional areas associated with 3D flying space 100 and 110.

Figure 2:
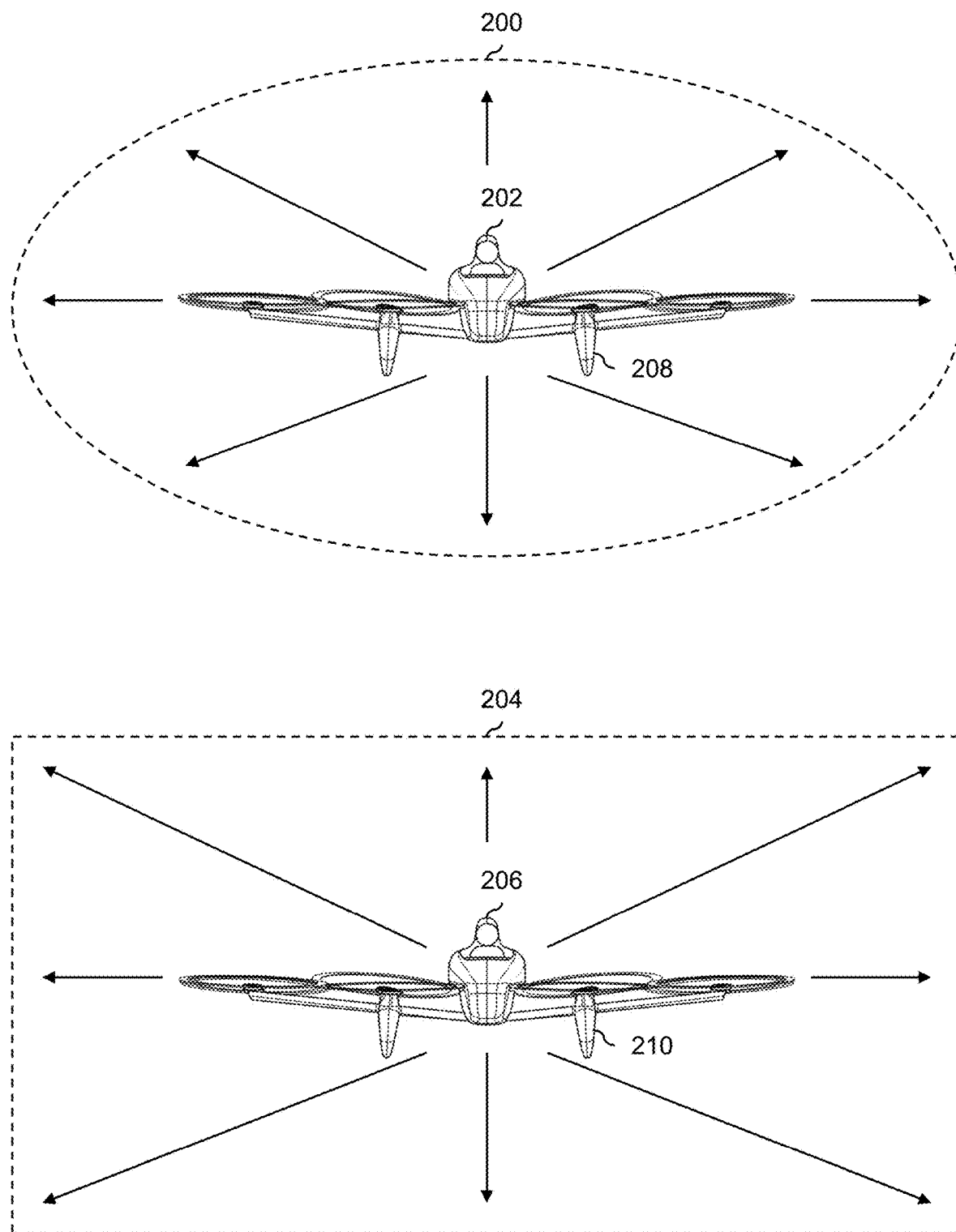
FIG. 2 is a diagram illustrating embodiments of cross-sectional areas associated with a three-dimensional (3D) flying space.

FIG. 2 is a diagram illustrating embodiments of cross-sectional areas associated with a three-dimensional (3D) flying space. In some embodiments, 3D flying spaces 100 and 110 in FIG. 1 have cross-sectional areas as shown here.

Cross-sectional area 200 shows an example where a 3D flying space has an elliptical cross-sectional area. Aircraft 202 shows an example of an aircraft which is constrained or otherwise configured to remain within the boundaries of a 3D flying space, including cross-sectional area 200, even if the pilot indicates, via the controls or input devices, that they want to fly outside of cross-sectional area 200. The pilot is permitted to steer or otherwise move the aircraft within cross-sectional area 200, so long as the plane does not move or otherwise fly beyond the boundary associated with cross-sectional area 200. For example, if the pilot was hovering and wanted to move upwards, that would be permitted so long as aircraft 202 does not move beyond the boundary associated with cross-sectional area 200. Otherwise, the pilot's input would be ignored (e.g., as the aircraft got closer to a top boundary, the aircraft would slow to a stop, even if/while an up-down thumbwheel used to control attitude were still being pushed up).

Cross-sectional area 204 shows an example where a 3D flying space has a rectangular cross-sectional area. As before, aircraft 206 is permitted to move about within cross-sectional area 204 per the input of the pilot (e.g., via a joystick, control, or other input device), so long as those instructions would not cause aircraft 206 to move beyond the boundaries of cross-sectional area 204. Elliptical cross section 200 and rectangular cross section 204 are merely two examples and any type of cross-sectional area or 3D flying space in general may be used.

In some embodiments, a cross-sectional dimension of a 3D flying space (e.g., radius, height, width, etc.) is based at least in part on the potential obstacles a pilot may encounter and would like to avoid. For example, on the San Francisco Bay where there are many different types of ships, a 3D flying space (e.g., 200 or 204) could be wide enough to avoid large tanker vessels or cargo containers and/or high enough to avoid sailboat masts. Naturally, whatever the dimensions, the 3D flying space would still be mutually exclusive and constructed to avoid areas of danger and/or concern.

In some embodiments, a 3D flying space is expressed in an efficient manner which reduces an amount of storage used (e.g., on an aircraft which stores the 3D flying space) and/or bandwidth consumed (e.g., if the 3D flying space is sent from and/or assigned by an assignor and the information is exchanged over some (e.g., wireless) network). In one example, a 3D flying space is broken up into one or more segments (i.e., the 3D flying space is defined piecewise) and each segment is expressed or otherwise represented using: (1) a center path (e.g., an imaginary line in the center of the cross section of the 3D flying space) and (2) a cross section about the center path.

In one example of the center path, suppose that the 3D flying space includes different segment types (e.g., some combination of linear segments and curved segments). A first segment may have a center path defined as a line from (e.g., GPS) coordinates (a, b) to (e.g., GPS) coordinates (c, d). Then, the next segment has a center path which is circular from coordinates (e, f) to (g, h) with a radius of 200 meters.

In one example of the cross section, the cross section may include a specification or selection of a shape type from one of several possible or permitted shapes (e.g., circle, ellipse, rectangle, etc.) with defined parameters that are relevant for that shape type (e.g., height and width for rectangular cross sections, radius for circular cross sections, etc.).

In some embodiments, there are "gaps" between adjacent or successive segments of a 3D flying space and interpolation is performed on-board the aircraft to determine the boundaries of the 3D flying space between the (e.g., explicitly and/or piecewise-defined) segments. Naturally, the interpolation is performed in a manner that ensures the 3D flying spaces are mutually exclusive. Using on-board interpolation may help to further improve the efficient representation of a 3D flying space (e.g., so that storage space and/or bandwidth consumption is further reduced).

In a similar approach, in some embodiments, segments are touching and/or contiguous but smoothing is performed where adjacent or successive segments meet. For example, suppose that the 3D flying space may be defined as piecewise, overlapping linear segments where on-board smoothing is performed so that the 3D flying space has rounded turns (e.g., for a smoother and/or more natural flying experience) instead of sharp, abrupt turns where the linear segments join each other. This may support an efficient manner in which to represent or otherwise store a 3D flying space while also supporting or otherwise enabling a smoother and/or more natural flying experience.

Returning to FIG. 1, for simplicity and ease of explanation, the exemplary 3D flying spaces shown there (100 and 110) each have a single entrance (102 and 112, respectively) and a single exit (114 and 116, respectively). In some embodiments, a 3D flying space has multiple entrances and/or exits. For example, if 3D flying spaces 100 and 110 were modified as such, this would permit people to land and get out of the aircraft at various spots of interest (e.g., Fisherman's Wharf, near the Golden Gate Bridge, on Angel Island, etc.) instead of being forced to remain in the aircraft for the entire ride. In some embodiments, the (e.g., additional) entrances and exits are routed in 3D space so that they do not overlap or otherwise intersect with other 3D flying spaces associated with other pilots and/or other aircraft. In some embodiments, there is a single, bidirectional entrance and exit (e.g., instead of having a dedicated, unidirectional entrance like entrances 102 and 112 and a dedicated, unidirectional exit like exits 114 and 116) for more compact routing and/or efficient use of (air)space.

As will be described in more detail below, a 3D flying space is virtual and it is not necessary to have infrastructure and/or devices in place in order for a 3D flying space to be defined and/or respected. For example, with this technique, it is not necessary for some physical device to be present or otherwise installed to (as an example) indicate or assign a 3D flying space to a particular aircraft. Rather, as will be described in more detail below, the aircraft has a sense of its location in the air and where the boundaries of the 3D flying space are. Both of these things enable the aircraft to stay within a 3D flying space, including by ignoring pilot input as/if needed.

In some embodiments, a 3D flying space is dynamic and/or temporal (e.g., lasting only for some time and not forever). For example, when the winds on the San Francisco Bay are strong, it may be desirable to have a larger distance between two adjacent 3D flying spaces. In one example, each morning, before people are permitted to take the aircraft out along the permitted routes, the distance between two adjacent 3D flying spaces is set according to the weather (e.g., with a larger separation if the winds are strong). To accommodate the larger separations, the number of 3D flying spaces may be decreased.

In the example of FIG. 1, the 3D flying spaces are unidirectional paths or routes with permitted directions of flight (i.e., they are one-way). That is, the aircraft are, under normal conditions where there is no emergency, only permitted to fly in a generally clockwise direction around the paths shown. In some embodiments, this unidirectional rule is lifted in the event of an emergency. Alternatively, a 3D flying space may not necessarily have a permitted direction of flight.

Although the techniques described herein may be used with any appropriate type of aircraft, the exemplary aircraft shown here in FIG. 2 may be desirable in some applications for the following reasons. The exemplary aircraft (202 and 206) are capable of performing a vertical takeoff and landing and have a relatively small size. This may be attractive in urban and/or densely populated areas such as San Francisco because there is no need for a long runway in order to take off and land. The exemplary aircraft (202 and 206) also include floats (208 and 210) which permit the aircraft to take off and land from water in addition to land. For example, the 3D flying spaces shown in FIG. 1 are located entirely over water, not over land. Flying over water is safer than flying over land (e.g., in the event of a crash or hard landing) and it may be easier to find open waterfront locations for takeoffs and landings compared to finding open land/ground for that purpose.

The following figure describes the examples above more generally and/or formally in a flowchart.

Figure 3:
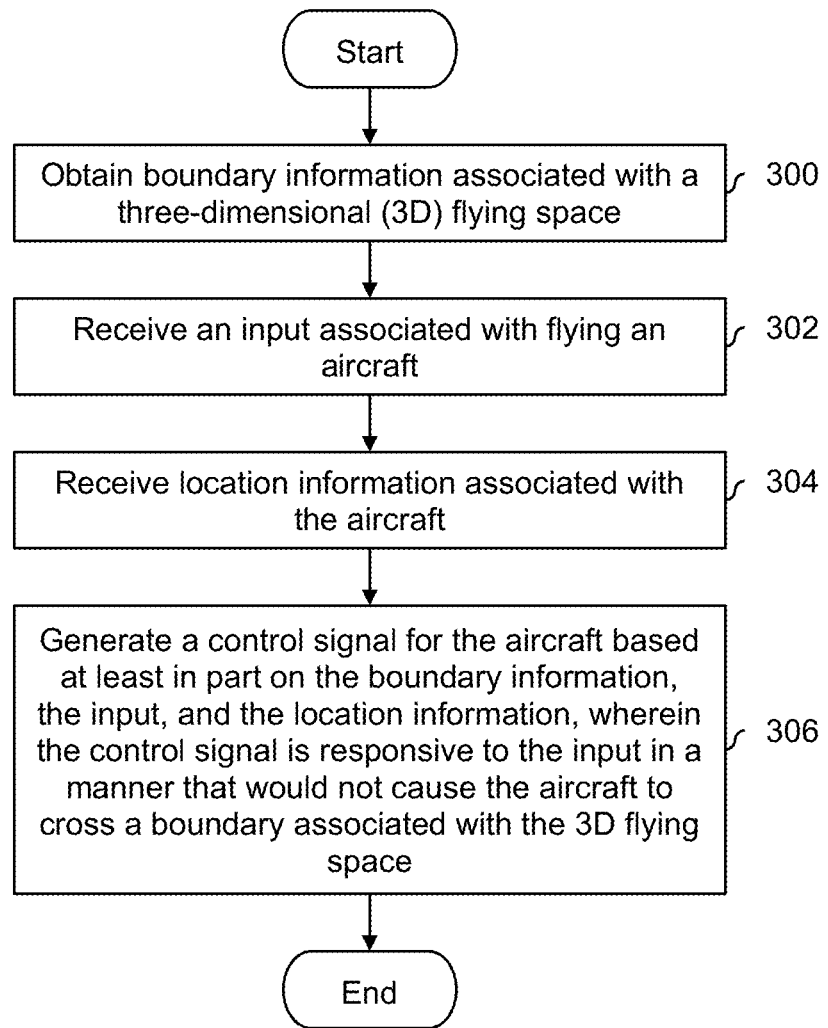
FIG. 3 is a flowchart illustrating an embodiment of a process to fly within a three-dimensional (3D) flying space.

FIG. 3 is a flowchart illustrating an embodiment of a process to fly within a three-dimensional (3D) flying space. In some embodiments, the process is performed by a flight computer or other processor within an aircraft.

At 300, boundary information associated with a three-dimensional flying space is obtained. For example, boundary information which describes the three-dimensional flying space may be received. 3D flying space 100 and 3D flying space 110 in FIG. 1 show examples of a 3D flying space from a top view. Cross-sectional areas 200 and 204 in FIG. 2 show examples of a cross-sectional area of a 3D flying space. In general, information is obtained at 300 which tells the aircraft where it is permitted to fly (i.e., inside its 3D flying space) and where it is not permitted to fly (i.e., outside its 3D flying space).

In some embodiments, information in addition to boundary information is obtained at step 300. For example, in FIG. 1, permitted route 100 has a permitted direction of flight (e.g., planes are permitted to fly in a clockwise direction through the path shown but not in a counterclockwise direction). In some embodiments, step 300 includes receiving information associated with a permitted direction of flight (e.g., clockwise).

In some embodiments, some segments or sections of the three-dimensional flying space have one set of rules (e.g., about the permitted directions of flight) and other segments or sections have different rules. For example, suppose that permitted route 100 in FIG. 1 instead had a "main loop" with multiple, bidirectional entrances and exits (e.g., for more compact routing and/or efficient use of space, as described above). In some embodiments, the information received or otherwise obtained at step 300 identifies which sections or parts of a 3D flying space have what set of associated rules (e.g., some indication that a "one way only rule" only applies to the main loop of a 3D flying space).

At 302, an input associated with flying an aircraft is received. For example, the technique described herein applies to aircraft which are controllable and/or steerable by a pilot (at least to some degree) and the information received at step 302 is (generally speaking) from a pilot and/or is associated with steering or otherwise controlling the aircraft (e.g., controlling the speed, position, and/or direction of flight of the aircraft). In one simple and easy-to-explain example, suppose that a pilot is flying at a constant altitude. In that case, the input is only associated with moving within a 2D plane defined by a longitudinal axis and a lateral axis (see, e.g., FIG. 1). Such a pilot input may be received via a joystick, via which the pilot indicates a desired direction of movement or flight within the 2D plane (e.g., where the desired direction is indicated by the direction the joystick is pointed in) as well as the desired speed or velocity in that direction (e.g., indicated by the displacement of the joystick from center).

At 304, location information associated with the aircraft is received. For example, this information may be received from a GPS system in the aircraft and may include the aircraft's latitude, longitude, and altitude (i.e., a position or location within 3D space).

At 306, a control signal is generated for the aircraft based at least in part on the boundary information, the input, and the location information, wherein the control signal is responsive to the input in a manner that would not cause the aircraft to cross a boundary associated with the 3D flying space.

For example, in the case of FIG. 2 where the exemplary aircraft is a 10 rotor multicopter, 10 control signals would be generated for each of the 10 rotors (there are no flaps or other control surfaces in that aircraft embodiment). In the context of FIG. 2, the input (e.g., from the pilot) would be obeyed in a manner that would not cause the aircraft (e.g., 202 or 206) to cross a boundary associated with a cross-sectional area (e.g., 200 or 204). For example, if the pilot held some up-down thumbwheel all the way up, the control signal(s) generated would cause the aircraft to ascend up until a top boundary was reached, at which point the thumbwheel would be ignored, even if the pilot continued to hold the thumbwheel in an up position.

In some embodiments, for safety and/or a more pleasant flight experience, the aircraft will slow down as it approaches the top boundary (e.g., prior to coming to a stop at some altitude or height below the top boundary), even if the up-down thumbwheel is being pushed or held up all the way.

In the example of FIG. 1, suppose that the first pilot (e.g., assigned to 3D flying space 100) had a joystick to indicate movement within some 2D plane. Input from the first pilot via the joystick would be obeyed so long as it would not cause the first aircraft to fly out of the permitted route or path associated with 3D flying space 100. For example, as described above, even if the first pilot held the joystick forward during straight section 104 and did not turn the joystick when 3D flying space 100 turned to the right at bend 108, the aircraft would (e.g., automatically) not permit the aircraft to continue on forward path or trajectory 106 which deviates from 3D flying space 100. Rather, the aircraft may come to a stop when straight section 104 ends and bend 108 begins (in one embodiment) or automatically turn to follow bend 108 (another embodiment) and ignore (at least to some degree) what the pilot is indicating via the joystick.

The following figure shows an example of devices or modules (e.g., in an aircraft) associated with the steps described above.

Figure 4:
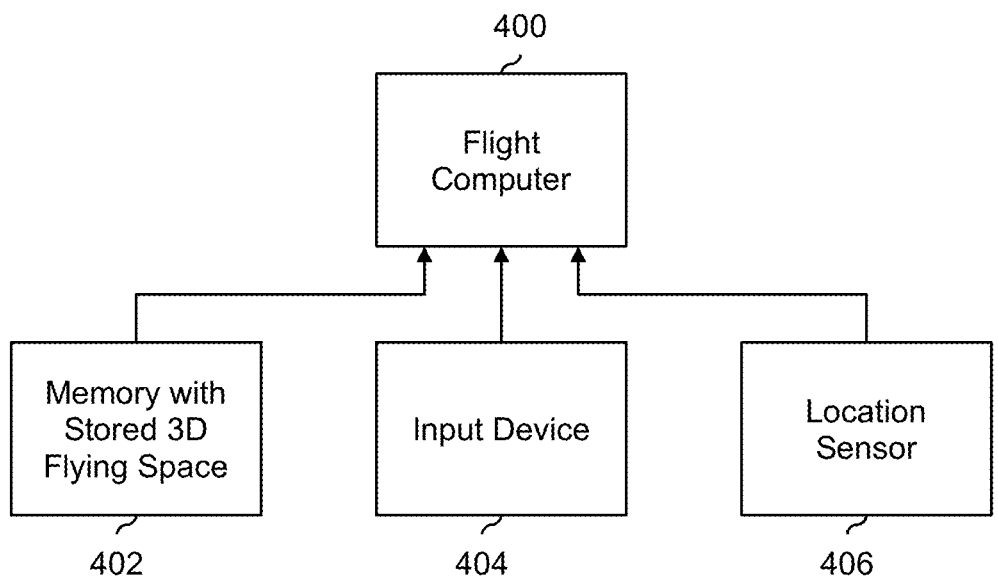
FIG. 4 is a diagram illustrating an embodiment of devices or modules in an aircraft associated with flying within a three-dimensional (3D) flying space.

FIG. 4 is a diagram illustrating an embodiment of devices or modules in an aircraft associated with flying within a three-dimensional (3D) flying space. In some embodiments, the steps described in FIG. 3 are performed by and/or using the devices or modules shown here. In this example, the decision maker is flight computer 400 which uses the information and/or inputs provided by the other blocks to generate a control signal per step 306 in FIG. 3. In other words, flight computer 400 is an example of a device or module (e.g., in an aircraft) which performs step 306 in FIG. 3.

In this example, the boundary information associated with a 3D flying space is stored in memory 402. As an example of step 300 in FIG. 3, flight computer 400 receives the boundary information associated with a 3D flying space from memory 402. For simplicity and ease of explanation, the selection or assignment of a particular 3D flying space for a given aircraft is not discussed at this time (i.e., how the information stored in memory 402 got there and/or was selected). Various examples describing how a particular 3D flying space may be selected by or otherwise assigned to a given aircraft are described in more detail below.

Input device 404 (such as a joystick, an up-down thumbwheel, etc.) is used to receive an input associated with flying or otherwise controlling an aircraft from a pilot. As an example of step 302 in FIG. 3, the flight computer (400) receives the input associated with flying an aircraft from input device 404.

Location sensor (406) provides the location of the aircraft to flight computer 400 and in some embodiments is a GPS system. As described above, the flight computer (400) will respond to the input from the pilot, so long as the pilot's input or instructions do not cause the aircraft to leave the 3D flying space.

The 3D flying spaces described above are merely exemplary and are not intended to be limiting. The following figures describe another embodiment of a 3D flying space.

Figure 5A:
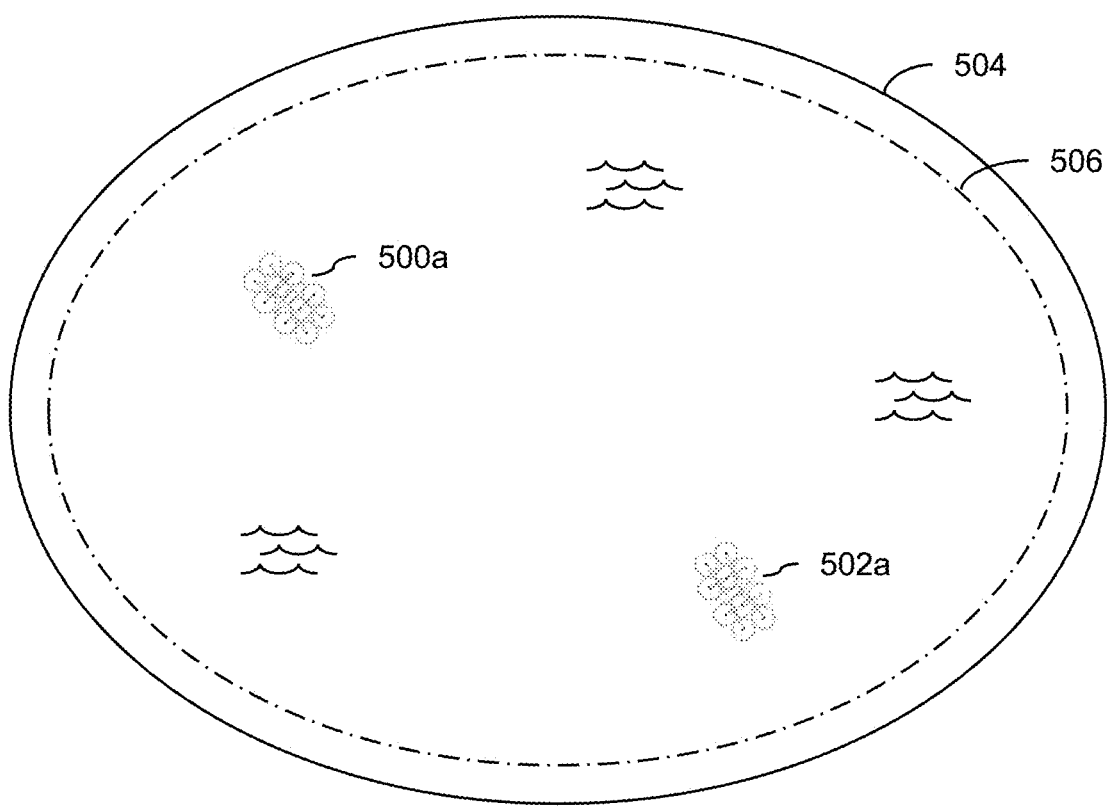
FIG. 5A is a diagram illustrating a top view of an embodiment of three-dimensional (3D) flying spaces associated with layers.

FIG. 5A is a diagram illustrating a top view of an embodiment of three-dimensional (3D) flying spaces associated with layers. In the example shown, two aircraft (500a and 502a) are flying over a lake (504). It is safer to fly over water than over ground, so in this example, 3D flying space 506 has a boundary that is completely over water. To ensure that the two aircraft flying over the lake do not collide with each other, the two aircraft are assigned to 3D flying spaces in different layers (i.e., non-overlapping ranges of altitudes). The following figure shows this more clearly.

Figure 5B:
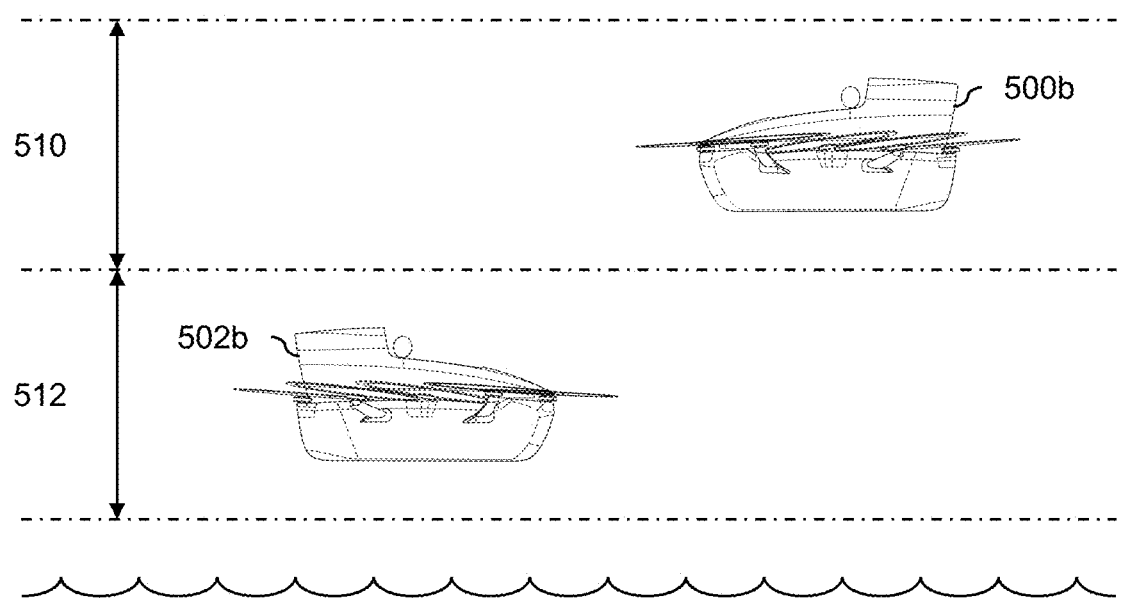
FIG. 5B is a diagram illustrating a side view of an embodiment of three-dimensional (3D) flying spaces associated with layers.

FIG. 5B is a diagram illustrating a side view of an embodiment of three-dimensional (3D) flying spaces associated with layers. In the example shown, the first aircraft (500b) is assigned to a 3D flying space (510) corresponding to an upper layer or top range of altitudes and the second aircraft (502b) is assigned to a 3D flying space (512) corresponding to a lower layer or bottom range of altitudes. This permits the two aircraft to fly over the lake at the same time while preventing collisions between the two aircraft.

For compactness, the example shown here has no gap or buffer zone between 3D flying space 510 and 3D flying space 512. In some embodiments, there is some gap or buffer zone between adjacent layers to further ensure the safety of the pilots and those around them.

Returning briefly to FIG. 3, the boundary information received at step 300 in this example would describe or otherwise include the boundary or perimeter associated with top-view boundary 506 shown in FIG. 5A, as well as the relevant range of permitted altitudes associated with either upper layer 510 or lower layer 512 shown in FIG. 5B.

In FIG. 5B, when the top aircraft (500b) wants to land, it would have to violate the bottom boundary associated with layer 510 and this action is not normally permitted. In some embodiments, the following technique is used when an aircraft wants to land.

Figure 6A:
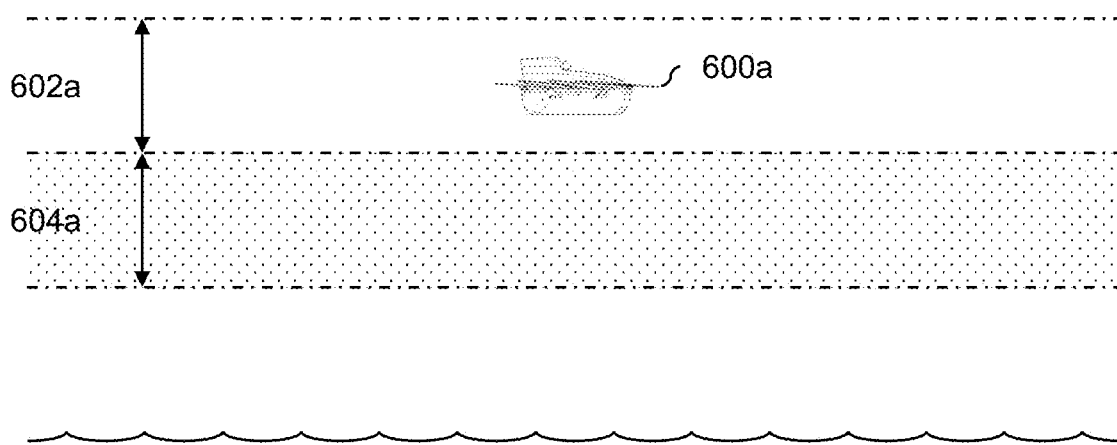
FIG. 6A is a diagram illustrating an embodiment of an aircraft that wants to land.

FIG. 6A is a diagram illustrating an embodiment of an aircraft that wants to land. In the example shown, a pilot associated with aircraft 600a has indicated or otherwise signaled that they want to land. For example, takeoff and landing may be the most dangerous part of a flight and the pilot may push a button to initiate an automated takeoff or landing sequence. In the state shown here, aircraft 600a is assigned to upper layer 602a. To land, the aircraft (600a) would have to leave the boundary associated with upper layer 602a and pass through the 3D flying space associated with lower layer 604a, which is not permitted. To permit the aircraft to land, a temporary column or pathway is created by temporarily modifying both upper layer 602a as well as lower layer 604a. The following figure shows an example of this.

Figure 6B:
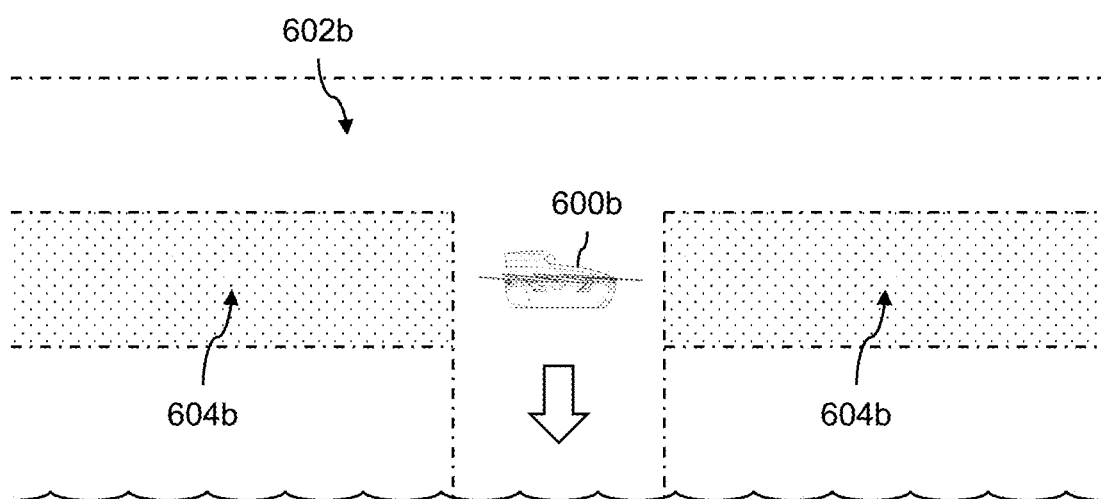
FIG. 6B is a diagram illustrating an embodiment of three-dimensional (3D) flying spaces associated with layers that have been temporarily modified so that an aircraft can land.

FIG. 6B is a diagram illustrating an embodiment of three-dimensional (3D) flying spaces associated with layers that have been temporarily modified so that an aircraft can land. In the state shown, upper layer 602b now includes a column or vertical channel which bisects lower layer 604b. As shown here, this permits the aircraft (600b) to land while staying within the boundaries of 3D flying space 602b.

Figure 6C:
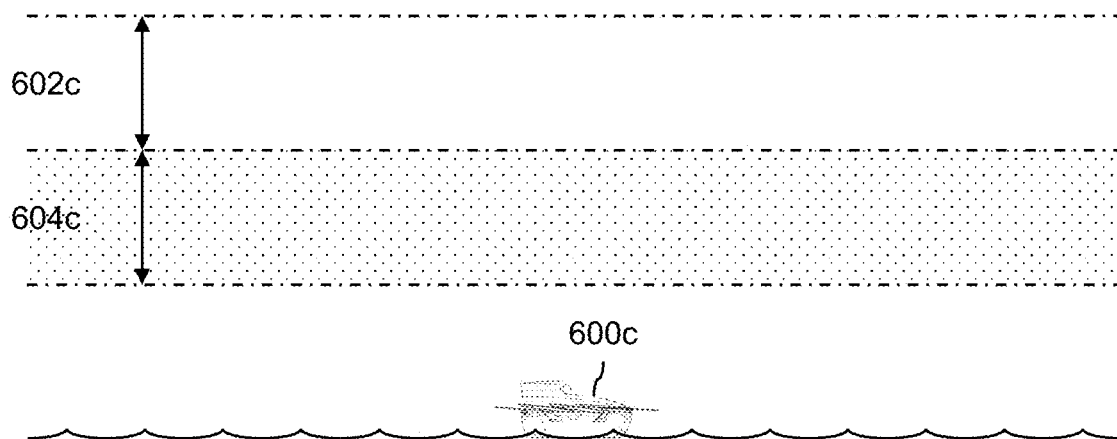
FIG. 6C is a diagram illustrating an embodiment of three-dimensional (3D) flying spaces associated with layers that have been returned to their original boundaries after an aircraft has landed.

FIG. 6C is a diagram illustrating an embodiment of three-dimensional (3D) flying spaces associated with layers that have been returned to their original boundaries after an aircraft has landed. In the state shown here, the aircraft (600c) has landed. The boundaries associated with the upper layer (602c) and the boundaries associated with the lower layer (604c) have been returned to their original boundaries so that there is no column or vertical channel which bisects the lower layer. Generally speaking, the 3D flying spaces and/or the boundaries are modified in such a way as to permit the aircraft to land while still ensuring that the 3D flying spaces remain non-overlapping at all times.

The following figure describes this example more generally and/or formally in a flowchart.

Figure 7:
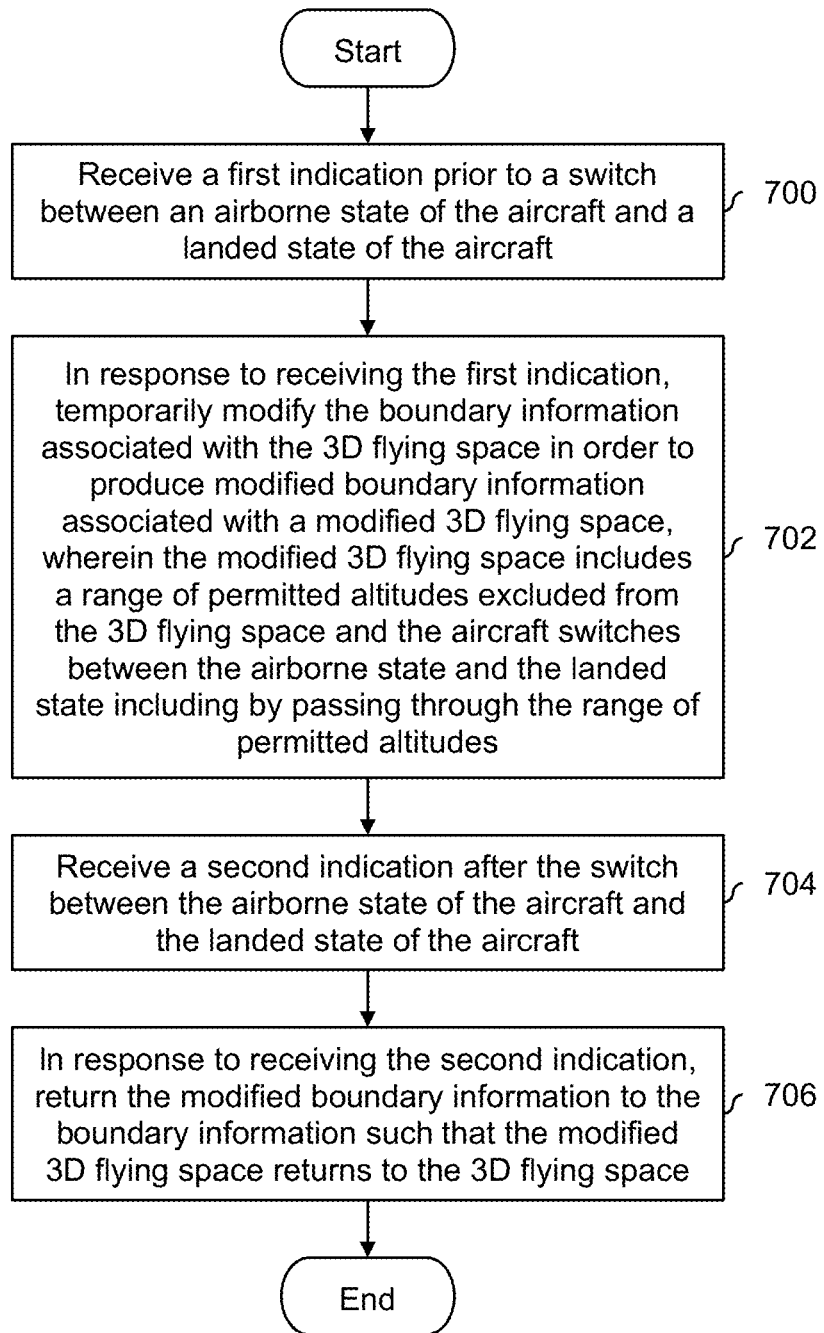
FIG. 7 is a flowchart illustrating an embodiment of a temporarily changing boundary information and/or a three-dimensional (3D) flying space so that an aircraft can take off or land.

FIG. 7 is a flowchart illustrating an embodiment of a temporarily changing boundary information and/or a three-dimensional (3D) flying space so that an aircraft can take off or land. In some embodiments, the process of FIG. 7 is performed in combination with the process of FIG. 3. In some embodiments, there is some memory manager (e.g., not shown in FIG. 4, but which can read from and write to memory 402) which updates the 3D flying space information stored in memory as/if needed. Alternatively, the process may be performed by a flight computer (e.g., flight computer 400 in FIG. 4).

At 700, a first indication is received prior to a switch between an airborne state of the aircraft and a landed state of the aircraft. For example, in FIG. 6A, the first indication may be received in the state shown there, where the pilot wants to land but has not yet made the transition from an airborne state to a landed state. As described above, in some embodiments, takeoffs and landings are performed autonomously (i.e., without pilot or human intervention and/or guidance) for safety and the indication received at 700 may be triggered by a pilot initiating an autonomous takeoff or landing process.

At 702, in response to receiving the first indication, the boundary information associated with the 3D flying space is temporarily modified in order to produce modified boundary information associated with a modified 3D flying space, wherein the modified 3D flying space includes a range of permitted altitudes excluded from the 3D flying space and the aircraft switches between the airborne state and the landed state including by passing through the range of permitted altitudes. See, for example, how the original 3D flying space 602a in FIG. 6A is temporarily modified to become modified 3D flying space 602b in FIG. 6B. There are new altitudes in modified 3D flying space 602b which were not previously included in the original 3D flying space (602a) and the aircraft (600b) flies through those new altitudes in order to land.

At 704, a second indication is received after the switch between the airborne state of the aircraft and the landed state of the aircraft. For example, in FIG. 6C, the aircraft (600c) has landed. In some embodiments, the end of an autonomous landing process and/or some indication that the aircraft has touched down may trigger the second indication at step 704.

At 706, in response to receiving the second indication, the modified boundary information is returned to the boundary information such that the modified 3D flying space returns to the 3D flying space. For example, modified 3D flying space 602b and bisected lower layer 604b in FIG. 6B return to original 3D flying space 602c and original lower layer 604c in FIG. 6C. The aircraft has landed, so the 3D flying spaces can return to their original and/or default configuration.

For brevity and clarity, FIG. 7 describes the modifications which are pertinent to the aircraft landing or taking off (see, e.g., the landing of aircraft 600a-600c in FIGS. 6A-6C). Additionally, modifications may be made to other 3D flying spaces (e.g., associated with other aircraft) which the ascending or descending aircraft passes through.

Naturally, this technique of temporarily modifying the 3D flying spaces (e.g., to create a temporary column or vertical channel) may also be used when an aircraft takes off. This technique may also be used with other types of 3D flying spaces (e.g., in combination with the 3D flying space embodiments shown in FIG. 1 and/or FIG. 2).

In various embodiments, the selection or assignment of a particular 3D flying space for a given aircraft may be performed in a variety of ways. First, an example is described in which there is some assignor or other device which assigns a 3D flying space to a particular aircraft. Then, another embodiment is described where there is no assignor or other authority and each aircraft selects for themselves what their 3D flying space is.

Figure 8A:
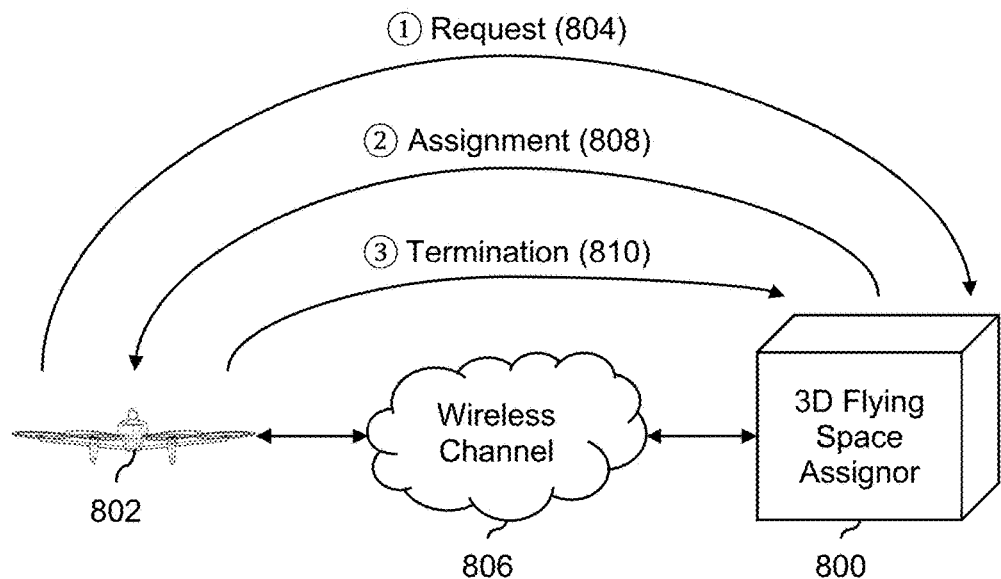
FIG. 8A is a diagram illustrating an embodiment of a three-dimensional (3D) flying space assignor.

FIG. 8A is a diagram illustrating an embodiment of a three-dimensional (3D) flying space assignor. In the example shown, 3D flying space assignor (800) acts as the authority which selects or otherwise assigns a 3D flying space to an aircraft. For example, suppose that a pilot in the example of FIG. 1 wants to take the flying tour of the San Francisco waterfront. The pilot would get in the aircraft (802) and a request (804) is sent from the aircraft to the 3D flying space assignor (800) via a wireless channel (806). In various embodiments, the wireless channel may include a cellular data network (e.g., 3G, 4G LTE, 4G, etc.), WiFi, etc. In some embodiments, the assignor is part of some base station which performs and/or supports other management, observational, and/or supervisorial functions relating to a group of aircraft.

In some embodiments, there are many assignors and each assignor is assigned and/or located at a particular local area. For example, there may be an assignor located at the San Francisco waterfront near where the 3D flying spaces 100 and 110 end. In some applications, having multiple and/or distributed assignors is desirable because it prevents bottlenecks (e.g., at some single assignor) and/or reduces single points of failures (e.g., if one assignor goes down, it does not necessarily mean that other assignors will also go down).

In response to the request (804), the 3D flying space assignor (800) selects or otherwise assigns the aircraft to a particular 3D flying space and sends this selection or assignment back to the aircraft (802) as assignment 808. In some embodiments, the aircraft (802) and assignor (800) are mutually aware of n predefined 3D flying spaces and the assignment (808) includes some index number or identifier (e.g., between 1 and n) of the predefined 3D flying space which is selected for and assigned to the requesting aircraft. For example, in the example of FIG. 1 where there are 2 3D flying spaces, the assignor may simply send back an indication of which track or route the aircraft is assigned to (e.g., the outer loop versus the inner loop). This approach may be desirable when short messages over the wireless channel are desired.

Once the assignment (808) is received, the aircraft will fly within the assigned 3D flying space as described above (see, e.g., FIG. 3). Once the pilot is done flying and no longer needs the assigned 3D flying space, a termination message (810) is sent from the aircraft to the assignor (800). This lets the assignor know that the 3D flying space is available and can be re-assigned to another aircraft that comes along. This message may be sent at a variety of times. In some embodiments, this message is bundled with and/or is sent when some automated landing sequence is initiated. Alternatively, the termination message may be sent when the aircraft has landed.

For simplicity and ease of explanation, a relatively simple handshaking and/or exchange is shown here. Naturally, additional handshaking or signaling may be performed as needed and/or desired. For example, in embodiments where the 3D flying space is temporarily modified for takeoffs and/or landings (see, e.g., FIGS. 6A-6C), additional handshaking and/or signaling may be performed. For example, the aircraft which wants to land or take off may send a request to the assignor with its location (e.g., so that the assignor knows where to create the column through the layers for takeoff or landing). The assignor then pushes out updates about the modified 3D flying spaces, including updates to the other aircraft (not shown) associated with lower layer 604a-604c in FIGS. 6A-6C, as well as to the aircraft which is taking off or landing (e.g., 600a-600c in FIGS. 6A-6C). Once the aircraft has completed its landing or takeoff, the aircraft may signal the assignor and the assignor may return the 3D flying spaces back to their original shapes.

The following figures show examples of the memory at various points in time, first when there are predefined 3D flying spaces and then when there are not.

Figures 8B, 8C:
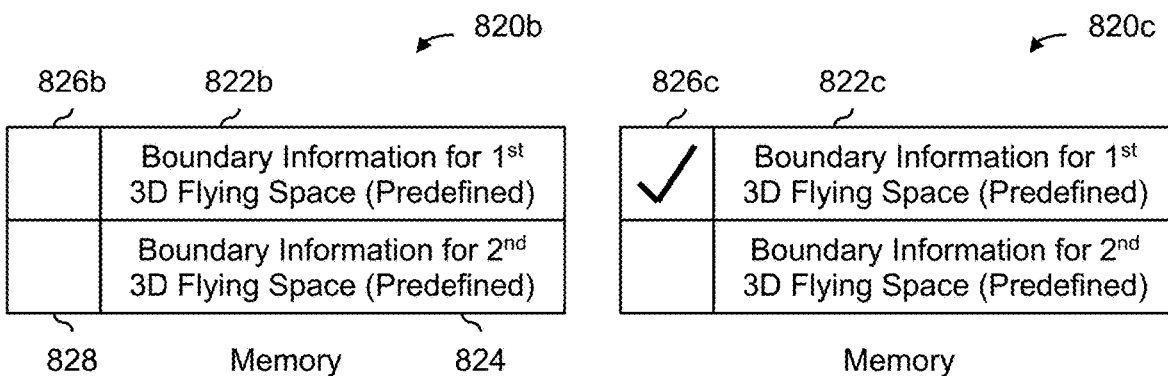
FIG. 8B is a diagram illustrating an embodiment of a memory with predefined 3D flying spaces prior to assignment by an assignor or selection by the aircraft.
FIG. 8C is a diagram illustrating an embodiment of a memory with predefined 3D flying spaces prior to assignment by an assignor or selection by the aircraft.

FIG. 8B is a diagram illustrating an embodiment of a memory with predefined 3D flying spaces prior to assignment by an assignor or selection by the aircraft. In the example shown, memory 820b is prepopulated (i.e., already stored) with the boundary information for a first 3D flying space (822b) and the boundary information for a second 3D flying space (824). For example, it may contain the boundary information for the outer loop 100 and inner loop 110 in FIG. 1.

The memory (820b) also includes fields or metadata (826b and 828) which are used to record or otherwise remember which predefined 3D flying space the aircraft has been assigned to, if any. In the state shown (e.g., where neither is checked), the aircraft has not been assigned to either 3D flying space. For example, this may correspond to the state of the memory before assignment 808 is received from 3D flying space assignor 800 in FIG. 8A.

FIG. 8C is a diagram illustrating an embodiment of a memory with predefined 3D flying spaces prior to assignment by an assignor or selection by the aircraft. FIG. 8C continues the example of FIG. 8B where the memory (820c) has been updated after the assignor has assigned the first (predefined) 3D flying space to the aircraft. In the state shown, the field or metadata (826c) associated with the first 3D flying space (822c) contains a checkmark, indicating that the aircraft has been assigned to that 3D flying space. The checkmark enables the system to know and/or remember which boundary information to use when generating a control signal.

In the context of FIG. 8A, the state of the memory shown here (820c) may correspond to the time between the assignment (808) (i.e., when the aircraft is assigned to that 3D flying space) and termination message (810) (i.e., when the aircraft gives up or otherwise releases the 3D flying space).

Alternatively, in some embodiments there are no predefined 3D flying spaces and an assignment (808) from 3D flying space assignor 800 in FIG. 8A includes a detailed description of the boundaries of the assigned 3D flying space. This approach may be desirable when memory is at a premium on the aircraft (e.g., the aircraft does not need to store n predefined 3D flying spaces) and/or if a more flexible layout or routing of the 3D flying spaces is desired. The following figures show an example of the memories for this embodiment.

Figures 8D, 8E:
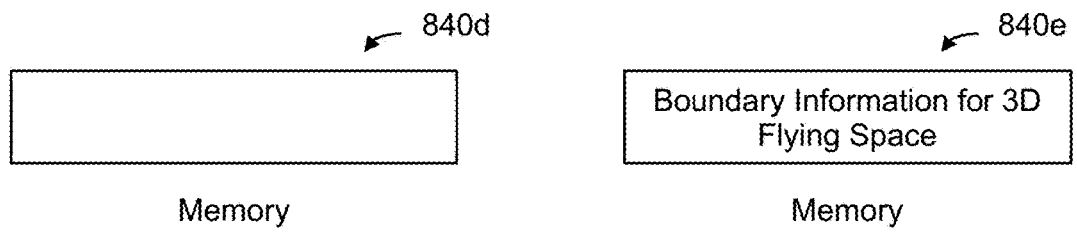
FIG. 8D is a diagram illustrating an embodiment of an empty memory prior to assignment by an assignor or selection by the aircraft.
FIG. 8E is a diagram illustrating an embodiment of a memory after assignment by an assignor or selection by the aircraft.

FIG. 8D is a diagram illustrating an embodiment of an empty memory prior to assignment by an assignor or selection by the aircraft. In the example shown, the memory (840d) is empty, indicating that no 3D flying space has been assigned to the aircraft.

FIG. 8E is a diagram illustrating an embodiment of a memory after assignment by an assignor or selection by the aircraft. In the example shown, the memory (840e) has been filled with the boundary information for a (e.g., given) 3D flying space. For example, the assignment (808) in FIG. 8A may include a detailed description of the boundaries for the assigned 3D flying space, and that information is recorded in memory 840e. Although it may require more information to be exchanged and/or communicated over a wireless channel, it may offer more flexibility. For example, the assignor (800) in FIG. 8A may take into account real-time environmental conditions (e.g., visibility, wind, etc.) and modify the boundaries of the assigned 3D flying space(s) accordingly (e.g., more space between adjacent 3D flying spaces, larger cross-sectional areas, etc. if there is more wind and/or worse visibility).

In some environments and/or applications, it may be desirable to use 3D flying spaces without having to use an assignor. For example, in undeveloped areas there may be no access to power and/or communication lines which 3D flying space assignor 800 may need. The following figure shows an embodiment where there is no assignor or other authority for selecting or otherwise assigning 3D flying spaces to a given aircraft.

Figure 9A:
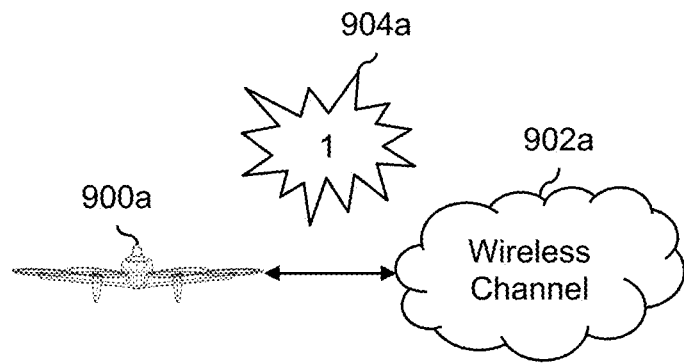
FIG. 9A is a diagram illustrating an embodiment of a single aircraft which periodically sends a broadcast.

FIG. 9A is a diagram illustrating an embodiment of a single aircraft which periodically sends a broadcast. In the example shown, aircraft 900a is the only aircraft in the area. Before taking off, aircraft 900a scans or otherwise listens for broadcasts on wireless channel (902a) from other aircraft.

As before, the wireless channel may include cellular data networks, WiFi, etc. No other aircraft are in the area, so no broadcasts are received. As such, aircraft 900a determines that it is the only aircraft in the area (e.g., because it heard no broadcasts from other aircraft) and determines that it is free to select any 3D flying space. In this example, for simplicity, all aircraft have knowledge of predefined 3D flying spaces in this area.

For example, referring back to FIG. 1, the aircraft may know from its GPS system that it is on the San Francisco waterfront and may therefore retrieve two predefined 3D flying spaces associated with that area. In the example of FIG. 1, the aircraft has its choice of either a first (predefined) 3D flying space (e.g., 100 in FIG. 1) or a second (predefined) 3D flying space since no other aircraft are present and all 3D flying spaces are free. In this example, the aircraft chooses to occupy the first 3D flying space (e.g., the outer loop 100 in FIG. 1) and therefore begins periodically transmitting a broadcast (904a), indicating that it is occupying the first 3D flying space.

Figure 9B:
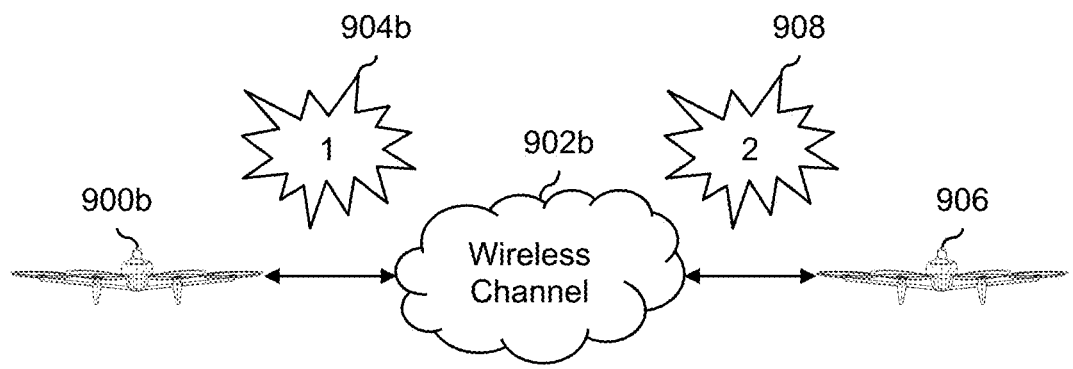
FIG. 9B is a diagram illustrating an embodiment of a second aircraft which enters an area and receives a broadcast from a first aircraft.

FIG. 9B is a diagram illustrating an embodiment of a second aircraft which enters an area and receives a broadcast from a first aircraft. In the state shown, a second aircraft (906) has entered the vicinity of the first aircraft (900b). For example, in FIG. 1, a second person/pilot has arrived and wants to take the tour of the San Francisco waterfront by aircraft and the first person/pilot is still sightseeing. The second aircraft (e.g., occupied by the second pilot) listens on the wireless channel (902b) and receives a broadcast (904b) from the first aircraft (900b) which indicates that the first aircraft is occupying the first 3D flying space (e.g., outer loop 100 in FIG. 1).

The second aircraft does not (e.g., after listening on the wireless channel for a certain amount of time) receive any broadcasts indicating that there is an aircraft in the second 3D flying space (e.g., inner loop 110 in FIG. 1) and concludes that the 3D flying space is available. The second aircraft then claims the second 3D flying space and indicates this to other aircraft by periodically sending broadcasts (908) over the wireless channel, indicating that the second aircraft (906) is occupying the second 3D flying space.

When a given aircraft is done flying and no longer needs its 3D flying space, it stops broadcasting. Then, other aircraft in the area that are monitoring and tracking the broadcasts will know that no aircraft is claiming the now-vacated 3D flying space and that it is available (for simplicity, this example assumes that all of the aircraft are aware of some number of predefined 3D flying spaces).

In various embodiments, the information which is communicated or otherwise included in a broadcast may vary. For example, suppose that there are no predefined 3D flying spaces (e.g., so that each aircraft has to "carve out" or otherwise define the boundaries of its 3D flying space). In some such embodiments, a broadcast merely indicates the presence or existence of an aircraft (e.g., the broadcast includes an aircraft identifier) and if a newly arrived aircraft wants to know the boundaries of a given aircraft's 3D flying space, it requests that information using the broadcasted aircraft identifier (e.g., querying each aircraft in the area in turn about the boundaries of their 3D flying space).

For brevity, figures showing how a memory may be updated when there is no assignor are not repeated since they are substantially similar to FIG. 8B and FIG. 8C (e.g., when all of the aircraft are aware of commonly agreed upon, predefined 3D flying spaces) and FIG. 8D and FIG. 8E (e.g., when there are no predefined 3D flying spaces).

The following figures describe the above examples more formally and/or generally in flowcharts.

FIG. 10A is a flowchart illustrating an embodiment of a process to obtain boundary information associated with a three-dimensional (3D) flying space using an assignor. In some embodiments, the information obtained at step 300 in FIG. 3 is obtained using this process.

At 1000, a request is sent to a 3D flying space assignor. See, for example, request 804 in FIG. 8A which is sent from aircraft 802 (e.g., which has not yet been assigned a 3D flying space) to 3D flying space assignor (800).

At 1002*a*, an assignment is received from the 3D flying space assignor. See, for example assignment 808 in FIG. 8A. As will be described in more detail below, the assignment may include a selection or other identification of a predefined 3D flying space (e.g., from a plurality or set of predefined 3D flying spaces). Alternatively, there may be no predefined flying spaces, and the assignment includes a detailed description of the boundaries of the 3D flying space to which the aircraft has been assigned.

At 1004*a*, information from the assignment is stored. For example, in FIG. 8B and FIG. 8C where there are predefined 3D flying spaces, the predefined 3D flying space to which the aircraft has been assigned is recorded (e.g., using a checkmark in field or metadata 826*c* in FIG. 8C). Alternatively, the boundary flying information received from the assignor may be stored (see, e.g., FIG. 8D and FIG. 8E).

FIG. 10B is a flowchart illustrating an embodiment of a process to obtain boundary information associated with a three-dimensional (3D) flying space using an assignor where there are predefined 3D flying spaces. In some embodiments, the information obtained at step 300 in FIG. 3 is obtained using this process. FIG. 10B is related to FIG. 10A and the same or similar steps are indicated using the same or similar reference numbers.

At 1000, a request is sent to a 3D flying space assignor.

At 1002*b*, an assignment is received from the 3D flying space assignor which includes a selection from a plurality of predefined 3D flying spaces with predefined boundary information which are already stored on the aircraft. For example, in FIG. 8A and FIG. 8B, the assignment (808) may identify whether the 3D flying space to which the aircraft is assigned is either the first 3D flying space (e.g., with predefined boundary information already stored at 822*b*) or the second 3D flying space (e.g., with predefined boundary information already stored at 824).

At 1004*b*, information from the assignment is stored, including by storing the selection. See, for example, the checkmark which is added to field or metadata 826*c* in FIG. 8C.

FIG. 10C is a flowchart illustrating an embodiment of a process to obtain boundary information associated with a three-dimensional (3D) flying space using an assignor where there are no predefined 3D flying spaces. In some embodiments, the information obtained at step 300 in FIG. 3 is obtained using this process. FIG. 10C is related to FIG. 10A and the same or similar steps are indicated using the same or similar reference numbers.

At 1000, a request is sent to a 3D flying space assignor.

At 1002*c*, an assignment is received from the 3D flying space assignor which includes the boundary information associated with the 3D flying space. For example, in FIG. 8D (e.g., before the assignment is received from the assignor), memory 840*d* is empty. The assignment (808) which is sent from the assignor (800) to the aircraft (802) in FIG. 8A includes all of the details of the boundaries of the assigned 3D flying space.

At 1004*c*, information from the assignment is stored, including by storing the boundary information associated with the 3D flying space. See, for example, FIG. 8E where the received boundary information is stored in memory 840*e* (which was previously empty).

Figure 11A:
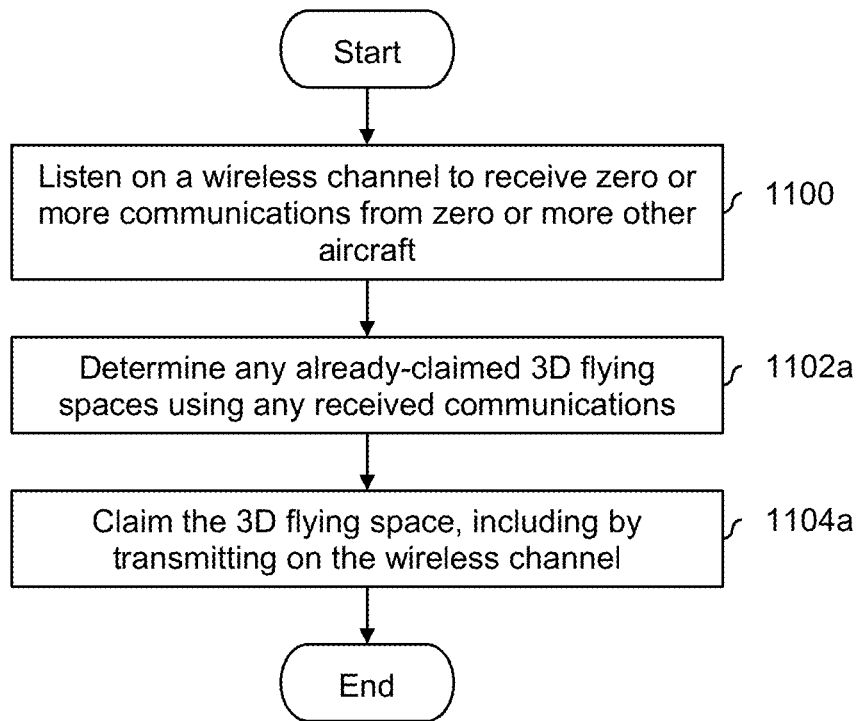
FIG. 11A is a flowchart illustrating an embodiment of a process to obtain boundary information associated with a three-dimensional (3D) flying space when there is no authority which assigns 3D flying spaces.

FIG. 11A is a flowchart illustrating an embodiment of a process to obtain boundary information associated with a three-dimensional (3D) flying space when there is no authority which assigns 3D flying spaces. In some embodiments, the information obtained at step 300 in FIG. 3 is obtained using this process.

At 1100, a wireless channel is listened to in order to receive zero or more communications from zero or more other aircraft. For example, in FIG. 9A, the first aircraft (900*a*) may listen to wireless channel 902*a* for some amount of time and since it is the only aircraft present, it will receive no communications. In contrast, in FIG. 9B, the second aircraft (906) will receive one or more communications (e.g., broadcast 904*b*) from the first aircraft (900*b*).

At 1102*a*, any already-claimed 3D flying spaces are determined using any received communications. For example, in FIG. 9A, aircraft 900*a* would determine that there are no already-claimed 3D flying spaces because there were no received communications and/or no aircraft in the area. In FIG. 9B, the second aircraft (906) would use the broadcast or communication (904*b*) from the first aircraft (900*b*) to determine what 3D flying space is claimed by that aircraft. As will be described below, this may include querying the aircraft for more information or alternatively the already-claimed 3D flying space is identified in the broadcast (904*b*) without any need for further querying.

At 1104*a*, the 3D flying space is claimed, including by transmitting on the wireless channel. See, for example, broadcast 908 transmitted by the second aircraft (906).

FIG. 11B is a flowchart illustrating an embodiment of a process to obtain boundary information associated with a three-dimensional (3D) flying space when there is no authority which assigns 3D flying spaces and there are predefined 3D flying spaces. In some embodiments, the information obtained at step 300 in FIG. 3 is obtained using this process. FIG. 11B is related to FIG. 11A and the same or similar steps are indicated using the same or similar reference numbers.

At 1100, a wireless channel is listened to in order to receive zero or more communications from zero or more other aircraft.

At 1102*b*, any already-claimed 3D flying spaces are determined using any received communications, wherein there is a plurality of predefined 3D flying spaces with predefined boundary information which are already stored on the aircraft and any received communications include an identification of any already-claimed predefined 3D flying space. In FIG. 9A and FIG. 9B, for example, there are 2 predefined 3D flying spaces and the first aircraft (900*a*/900*b*) has claimed the first predefined 3D flying space. As such, its broadcasts or communications (e.g., 904*a*/904*b*) include a "1" to indicate that it is claiming or otherwise occupying that predefined 3D flying space.

At 1104*b*, the 3D flying space is claimed, including by transmitting on the wireless channel, wherein the transmission on the wireless channel includes an identification of the claimed 3D flying space. See, for example, FIG. 9B, where the second aircraft (906) claims the second predefined 3D flying space by including an index or identifier of "2" in its broadcast or communication (908).

FIG. 11C is a flowchart illustrating an embodiment of a process to obtain boundary information associated with a three-dimensional (3D) flying space when there is no authority which assigns 3D flying spaces and there are no predefined 3D flying spaces. In some embodiments, the information obtained at step 300 in FIG. 3 is obtained using this process. FIG. 11C is related to FIG. 11A and the same or similar steps are indicated using the same or similar reference numbers.

At 1100, a wireless channel is listened to in order to receive zero or more communications from zero or more other aircraft.

At 1102c, any already-claimed 3D flying spaces are determined using any received communications, including by querying any other aircraft from which any communication is received. In this example, it is inefficient to include all of an aircraft's boundary information in each of its broadcasts and/or communications over the wireless channel. As such, a broadcast or communication (in this example at least) includes (e.g., only) an aircraft's identifier and the identifier can be used by other aircraft to query that aircraft about their boundaries and/or 3D flying spaces as/if needed (e.g., "Aircraft with identifier X, what is/are your boundaries and/or 3D flying space?").

At 1104c, the 3D flying space is claimed, including by transmitting on the wireless channel, wherein the transmission on the wireless channel includes an identification of the aircraft. As described above, in this example it is inefficient to broadcast all of an aircraft's boundary information in each communication and broadcast and so only an identifier (e.g., which can be used later in a query) is included in the transmission.

In some embodiments, a 3D flying may be adapted (e.g., in real time and/or on-the-fly) in response to changing conditions. For example, suppose that the aircraft is flying over the San Francisco Bay which has large cargo containers which are relatively large in all dimensions (e.g., they are long, tall, and wide). In some embodiments, the techniques described above (e.g., in any of FIGS. 10A-11C) is adapted based on the non-stationary location of large ships (e.g., cargo containers, ferries, etc.) or other moving obstacles. In one example, at least some ships (e.g., commercial boats longer than 60 feet) on the San Francisco Bay have transponders (e.g., GPS transponders, AIS transponders, etc.) and report their locations. This reported ship location information is publically available via a public interface or public portal, such as a publically-accessible website, and this information is obtained and used to adjust 3D flying spaces as or if needed. In some embodiments, using publically-accessible ship location information is desirable because it eliminates the need for heavy and/or expensive sensors (e.g., LIDAR, radar, etc.) on the aircraft (e.g., the aircraft may have a very strict maximum weight limitation because the aircraft is an ultralight).

To use FIGS. 10A-10C (where there is a 3D flying space assignor) as an example, the 3D flying space assignor keeps track of the locations of ships on the San Francisco Bay, the locations of aircraft which have been assigned a 3D flying space, and the 3D flying spaces assigned to those aircraft. If it is determined that a ship will pass through a 3D flying space when the aircraft is in the vicinity of that intrusion into the 3D flying space (i.e., it flags a potential and/or high-likelihood collision between the ship and aircraft), the 3D flying space assignor in some embodiments will contact the aircraft in question and change the assigned 3D flying space so that the aircraft is (as an example) forced to stop (e.g., the 3D flying space assigned to that aircraft is changed or otherwise adjusted so it comes to a dead end, at least temporarily) or so that the 3D flying space is routed around the path of the intruding ship and the aircraft and the ship will not collide.

In the context of FIGS. 11A-11C, this tracking of ships' locations, determination that a ship and a vehicle could potentially collide, and adjustment of the 3D flying space in response to that are done by the aircrafts themselves (e.g., since in that paradigm they claim 3D flying spaces for themselves, assuming such space is not already claimed).

To put it more generally and in context with FIG. 3, the boundary information associated with a 3D flying space (e.g., obtained at step 300) is modified in response to identification of a potential collision between a moving object and the aircraft using publically-available location information associated with the moving object. In some such embodiments, the moving object includes a ship and the publically-available location information associated with the moving object is associated with Automatic Identification System (AIS) information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a memory;
  an input device;
  a location sensor; and
  a flight computer which is configured to:
    obtain boundary information associated with a three-dimensional (3D) flying space from the memory, comprising to:
      send a request to a 3D flying space assignor;
      receive, from the 3D flying space assignor, an assignment which includes a selection from a plurality of predefined 3D flying spaces with predefined boundary information which are already stored on the aircraft; and
      store information from the assignment, including by storing the selection;
    receive an input associated with flying an aircraft from the input device;
    receive location information associated with the aircraft from the location sensor; and
    generate a control signal for the aircraft based at least in part on the boundary information, the input, and the location information, wherein the control signal is responsive to the input in a manner that would not cause the aircraft to cross a boundary associated with the 3D flying space, wherein the generating of the control signal for the aircraft comprises to:
      receive a first indication prior to a switch from a landed state of the aircraft to an airborne state of the aircraft;
      in response to receiving the first indication, temporarily modify the boundary information associated with the 3D flying space in order to produce modified boundary information associated with a modified 3D flying space, wherein the modified 3D flying space includes a range of permitted altitudes excluded from the 3D flying space and the aircraft switches between the landed state and the airborne state including by passing through the range of permitted altitudes;

receive a second indication after the switch from the landed state of the aircraft to the airborne state of the aircraft; and in response to receiving the second indication, return the modified boundary information to the boundary information such that the modified 3D flying space returns to the 3D flying space.

2. The system recited in claim 1, wherein the 3D flying space has one or more of the following cross sections: a circular cross section, an elliptical cross section, or a rectangular cross section.

3. The system recited in claim 1, wherein:
the 3D flying space includes an entrance and an exit; and
a length of the 3D flying space, measured from the entrance to the exit, is larger than a height or a width of a cross-sectional area associated with the 3D flying space.

4. The system recited in claim 1, wherein the boundary information associated with the 3D flying space includes a range of permitted altitudes and a perimeter.

5. The system recited in claim 1, wherein obtaining the boundary information associated with the 3D flying space includes:
receiving, from the 3D flying space assignor, the assignment which includes the boundary information associated with the 3D flying space; and
storing information from the assignment, including by storing the boundary information associated with the 3D flying space.

6. The system recited in claim 1, wherein obtaining the boundary information associated with the 3D flying space includes:
listening on a wireless channel to receive zero or more communications from zero or more other aircraft;
determining any already-claimed 3D flying spaces using any received communications; and
claiming the 3D flying space, including by transmitting on the wireless channel.

7. The system recited in claim 1, wherein obtaining the boundary information associated with the 3D flying space includes:
listening on a wireless channel to receive zero or more communications from zero or more other aircraft;
determining any already-claimed 3D flying spaces using any received communications, wherein there is a plurality of predefined 3D flying spaces with predefined boundary information which are already stored on the aircraft and any received communications include an identification of any already-claimed predefined 3D flying spaces; and
claiming the 3D flying space, including by transmitting on the wireless channel, wherein the transmission on the wireless channel includes an identification of the claimed 3D flying space.

8. The system recited in claim 1, wherein obtaining the boundary information associated with the 3D flying space includes:
listening on a wireless channel to receive zero or more communications from zero or more other aircraft;
determining any already-claimed 3D flying spaces using any received communications, including by querying any other aircraft from which any communication is received; and
claiming the 3D flying space, including by transmitting on the wireless channel, wherein the transmission on the wireless channel includes an identification of the aircraft.

9. The system recited in claim 1, wherein the boundary information associated with the 3D flying space is modified in response to identification of a potential collision between a moving object and the aircraft using publically-available location information associated with the moving object.

10. The system recited in claim 1, wherein:
the boundary information associated with the 3D flying space is modified in response to identification of a potential collision between a moving object and the aircraft using publically-available location information associated with the moving object;
the moving object includes a ship; and
the publically-available location information associated with the moving object is associated with Automatic Identification System (AIS) information.

11. A method, comprising:
obtaining boundary information associated with a three-dimensional (3D) flying space, comprising:
sending a request to a 3D flying space assignor;
receiving, from the 3D flying space assignor, an assignment which includes a selection from a plurality of predefined 3D flying spaces with predefined boundary information which are already stored on the aircraft; and
storing information from the assignment, including by storing the selection;
receiving an input associated with flying an aircraft from an input device;
receiving location information associated with the aircraft from a location sensor; and
generating a control signal for the aircraft based at least in part on the boundary information, the input, and the location information, wherein the control signal is responsive to the input in a manner that would not cause the aircraft to cross a boundary associated with the 3D flying space, wherein the generating of the control signal for the aircraft comprises:
receiving a first indication prior to a switch from a landed state of the aircraft to an airborne state of the aircraft;
in response to receiving the first indication, temporarily modifying the boundary information associated with the 3D flying space in order to produce modified boundary information associated with a modified 3D flying space, wherein the modified 3D flying space includes a range of permitted altitudes excluded from the 3D flying space and the aircraft switches between the landed state and the airborne state including by passing through the range of permitted altitudes;
receiving a second indication after the switch from the landed state of the aircraft to the airborne state of the aircraft; and
in response to receiving the second indication, returning the modified boundary information to the boundary information such that the modified 3D flying space returns to the 3D flying space.

12. The method recited in claim 11, wherein obtaining the boundary information associated with the 3D flying space includes:
listening on a wireless channel to receive zero or more communications from zero or more other aircraft;
determining any already-claimed 3D flying spaces using any received communications; and
claiming the 3D flying space, including by transmitting on the wireless channel.

13. The method recited in claim 11, wherein the boundary information associated with the 3D flying space is modified in response to identification of a potential collision between a moving object and the aircraft using publically-available location information associated with the moving object.

14. The method recited in claim 11, wherein:
the boundary information associated with the 3D flying space is modified in response to identification of a potential collision between a moving object and the aircraft using publically-available location information associated with the moving object;
the moving object includes a ship; and
the publically-available location information associated with the moving object is associated with Automatic Identification System (AIS) information.

15. A computer program product, the computer program product being embodied in a non-transitory computer readable storage medium and comprising computer instructions for:
obtaining boundary information associated with a three-dimensional (3D) flying space, comprising:
sending a request to a 3D flying space assignor;
receiving, from the 3D flying space assignor, an assignment which includes a selection from a plurality of predefined 3D flying spaces with predefined boundary information which are already stored on the aircraft; and
storing information from the assignment, including by storing the selection;
receiving an input associated with flying an aircraft from an input device;
receiving location information associated with the aircraft from a location sensor; and
generating a control signal for the aircraft based at least in part on the boundary information, the input, and the location information, wherein the control signal is responsive to the input in a manner that would not cause the aircraft to cross a boundary associated with the 3D flying space, wherein the generating of the control signal for the aircraft comprises:
receiving a first indication prior to a switch from a landed state of the aircraft to an airborne state of the aircraft;
in response to receiving the first indication, temporarily modifying the boundary information associated with the 3D flying space in order to produce modified boundary information associated with a modified 3D flying space, wherein the modified 3D flying space includes a range of permitted altitudes excluded from the 3D flying space and the aircraft switches between the landed state and the airborne state including by passing through the range of permitted altitudes;
receiving a second indication after the switch from the landed state of the aircraft to the airborne state of the aircraft; and
in response to receiving the second indication, returning the modified boundary information to the boundary information such that the modified 3D flying space returns to the 3D flying space.

* * * * *